US012327052B2

(12) United States Patent
Wang et al.

(10) Patent No.: US 12,327,052 B2
(45) Date of Patent: Jun. 10, 2025

(54) CHIP, CHIPSET, ELECTRICAL PARAMETER DETECTION METHOD, CONSUMABLE, AND IMAGE FORMING APPARATUS

(71) Applicant: Zhuhai Pantum Electronics Co., Ltd., Zhuhai (CN)

(72) Inventors: Bo Wang, Zhuhai (CN); Haixiong Li, Zhuhai (CN); Aiguo Yin, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/483,505

(22) Filed: Oct. 9, 2023

(65) Prior Publication Data
US 2024/0036779 A1 Feb. 1, 2024

Related U.S. Application Data

(63) Continuation of application No. 17/485,851, filed on Sep. 27, 2021, now Pat. No. 11,816,369.

(30) Foreign Application Priority Data
Sep. 28, 2020 (CN) .......................... 202011041361.2

(51) Int. Cl.
G06F 3/12 (2006.01)
(52) U.S. Cl.
CPC ............ *G06F 3/121* (2013.01); *G06F 3/1279* (2013.01); *G06F 3/12* (2013.01)
(58) Field of Classification Search
None
See application file for complete search history.

(56) References Cited

U.S. PATENT DOCUMENTS

2004/0252745 A1\* 12/2004 Park ................... B28B 23/0031
374/102
2007/0223942 A1 9/2007 Miller
(Continued)

FOREIGN PATENT DOCUMENTS

CN 101017393 A 8/2007
CN 102142276 A 8/2011
(Continued)

OTHER PUBLICATIONS

Anonymous: "User's Guide TPS3899EVM Voltage Supervisor User Guide",Sep. 2, 2020 (Sep. 2, 2020) , pp. 1-17,XP055884801, Retrieved from the Internet: URL:https://www.ti.com/lit/ug/slvubz3/slvubz3.pdf [retrieved on Jan. 28, 2022] * pp. 2,3,9-11 *.
(Continued)

*Primary Examiner* — Darryl V Dottin
(74) *Attorney, Agent, or Firm* — Anova Law Group, PLLC

(57) ABSTRACT

A chip, a chip set, an electrical parameter detection method, a consumable, and an image forming apparatus are provided in embodiments of the present disclosure. The chip is capable of being installed on the consumable; and the consumable is capable of being detachably installed on the image forming apparatus. The chip includes an installation detecting terminal; a chip controller configured to control the installation detecting terminal to output a low level after the chip is powered on; and a storage unit configured to store a time control parameter, where the time control parameter is configured to control a time point for the installation detecting terminal to output the low level. The above configuration can realize that the signal conflict between a plurality of chips is not generated when detecting whether the plurality of chips is in a desired contact with the image forming apparatus.

27 Claims, 9 Drawing Sheets

(56) References Cited

U.S. PATENT DOCUMENTS

| | | | |
|---|---|---|---|
| 2010/0259579 A1* | 10/2010 | Wu | B41J 2/1753 347/29 |
| 2013/0321853 A1* | 12/2013 | Lee | H04N 1/4433 358/1.14 |
| 2016/0269580 A1* | 9/2016 | Ito | H04N 1/00896 |
| 2019/0196361 A1 | 6/2019 | Kyotani | |
| 2019/0377279 A1 | 12/2019 | Yoshida | |
| 2019/0384205 A1 | 12/2019 | Furuta | |
| 2020/0241461 A1 | 7/2020 | Zhang et al. | |
| 2022/0342344 A1* | 10/2022 | Yu | G03G 15/0863 |

FOREIGN PATENT DOCUMENTS

| | | |
|---|---|---|
| CN | 102423967 A | 4/2012 |
| CN | 103744273 A | 4/2014 |
| CN | 107053854 A | 8/2017 |
| CN | 105652179 B | 10/2018 |
| CN | 109976125 A | 7/2019 |
| CN | 110412852 A | 11/2019 |
| EA | 11203 B1 | 2/2009 |
| RU | 2516834 C2 | 5/2014 |
| RU | 2619139 C1 | 5/2017 |
| RU | 2721893 C2 | 5/2020 |

OTHER PUBLICATIONS

Anonymous: "TPS3899 Nano-Power,Precision Voltage Supervisor, Push-Button Monitor with Programmable Sense and Reset Delay",Sep. 30, 2020 (Sep. 30, 2020) ,pp. 1-34,XP055884807, Retrieved from the Internet: URL: https://www.ti.com/lit/ds/symlink/tps3899.pdf [retrieved on Jan. 28, 2022] * pp. 1,13-15-pp. 18-20 *.

* cited by examiner ately matched with other components in the image forming apparatus; or when an incorrect type consumable is installed in the image forming apparatus, it may also result in that the consumable may not be appropriately matched with other components in the image forming apparatus; or even if an incorrect type consumable is installed and can be structurally matched with other components in the image forming apparatus, the incorrect type consumable may not meet image forming requirements of the image forming apparatus, which may result in reduced image forming quality. In order to prevent the consumable from not being installed in the preset position in the image forming apparatus or the incorrect type consumable from being installed in the image forming apparatus, the consumable may be normally provided with a chip that matches the main body of the image forming apparatus to detect consumable features in the existing technology, which can be configured to detect whether the consumable is in a desired contact with the image forming apparatus. Specifically, after the chip is powered on, a low level may be generated to the image forming apparatus, such that a current loop may be formed between the chip and the image forming apparatus, and the image forming apparatus may determine whether the image forming apparatus is in a desired contact with the chip according to the electrical parameter of the current loop.

CHIP, CHIPSET, ELECTRICAL PARAMETER DETECTION METHOD, CONSUMABLE, AND IMAGE FORMING APPARATUS

CROSS-REFERENCE TO RELATED APPLICATION

This application is a continuation application of U.S. patent application Ser. No. 17/485,851 filed on Sep. 27, 2021, which in turn claims priority of Chinese Patent Application No. 202011041361.2, filed with the China National Intellectual Property Administration on Sep. 28, 2020, the entire content of all of which is incorporated herein by reference.

TECHNICAL FIELD

The present disclosure generally relates to the field of image processing technology and, more particularly, relates to a chip, a chipset, an electrical parameter detection method, a consumable, and an image forming apparatus.

BACKGROUND

With the development of image forming technology, image forming apparatuses, as a type of computer peripheral equipment, have gradually gained popularity in offices and homes due to their advantages including high speed, low cost of single-page image forming, and the like. According to different functions, image forming apparatuses may include printers, copiers, multifunction machines, and the like. According to different imaging principles, image forming apparatuses may include laser printers, inkjet printers, dot matrix printers, and the like.

The image forming apparatus may normally be disposed with consumables that need to be replaced. Taking the laser printer as an example, the consumables may include a processing cartridge or a developing cartridge for containing developer, a drum assembly, a fixing assembly, a paper holding unit, and/or the like. Taking the inkjet printer as an example, the consumables may include an ink cartridge, an ink container, and/or the like. Taking the dot matrix printer as an example, replaceable units may include a ribbon box and/or the like. When a consumable is not installed in a preset position as required, the consumable may not be appropri- However, the inventor found in the process of implementing the present disclosure that the consumables of the image forming apparatus may normally be multiple (e.g., four); if multiple chips are controlled to output low levels for detection at a certain time interval, signal conflict may occur due to different chip power-on initialization time or different main chip frequencies when multiple chips are powered on, that is, the image forming apparatus may receive the low levels outputted from multiple chips simultaneously. Therefore, it may not identify which consumable chip does a low-level signal come from, which is inconvenient for detection operation.

SUMMARY

A chip, a chip set, an electrical parameter detection method, a consumable, and an image forming apparatus are provided in embodiments of the present disclosure, which may realize that the signal conflict between a plurality of chips is not generated when detecting whether the plurality of chips is in a desired contact with the image forming apparatus.

The first aspect of exemplary embodiments of the present disclosure provides a chip, including:
   an installation detecting terminal;
   a chip controller, configured to control the installation detecting terminal to output a low level after the chip is powered on; and
   a storage unit, configured to store a time control parameter, where the time control parameter is configured to control a time point for the installation detecting terminal to output the low level.

The second aspect of exemplary embodiments of the present application provides a chipset, including:
   M chips, where the M chips are capable of being installed on a plurality of consumables in one-to-one correspondence; the plurality of consumables are capable of being detachably installed on an image forming apparatus; and each chip includes:
   an installation detecting terminal; and
   a chip controller, configured to control the installation detecting terminal of the each chip to output a low level after the chip is powered on, where time points for installation detecting terminals of all of the M chips to output low levels are different from each other, and M is a natural number greater than or equal to 2.

The third aspect of exemplary embodiments of the present application provides an electrical parameter detection method, applied between an image forming apparatus and a chip, where the chip is installed on a consumable; the consumable is detachably installed on the image forming apparatus; the image forming apparatus includes an installation detecting pin; and the chip includes a chip controller and an installation detecting terminal; and the electrical parameter detection method comprising:
   configuring, by the image forming apparatus, the installation detecting pin to be at a high level;
   controlling, by the chip controller, the installation detecting terminal to output a low level, such that a current loop is formed between the image forming apparatus and the chip; and
   determining, by the image forming apparatus, whether the image forming apparatus is in a desired contact with the chip according to an electrical parameter of the current loop, where the chip controller controls a time point for the installation detecting terminal to output the low level based on a time control parameter.

The fourth aspect of exemplary embodiments of the present application provides an electrical parameter detection method, applied between an image forming apparatus and a chipset, where the chipset includes M chips; the M chips are installed on a plurality of consumables in a one-to-one correspondence; the plurality of consumables are detachably installed on the image forming apparatus; the image forming apparatus includes an installation detecting pin; and each chip includes an installation detecting terminal and a chip controller, the electrical parameter detection method comprising:

configuring, by the image forming apparatus, the installation detecting pin to be at a high level;

controlling, by the chip controller of each chip, the installation detecting terminal to output a low level, such that a current loop is formed between the image forming apparatus and the chip; and determining, by the image forming apparatus, whether the image forming apparatus is in a desired contact with the chip according to an electrical parameter of the current loop, where time points for installation detecting terminals of all of the M chips to output low levels are different from each other, and M is a natural number greater than or equal to 2.

The fifth aspect of exemplary embodiments of the present application provides a consumable, including:

a developer accommodating portion, configured for accommodating a developer; and the chip according to any feasible implementation manner in the first aspect and the second aspect mentioned above.

The sixth aspect of exemplary embodiments of the present application provides a consumable, including:

a photosensitive drum;

a charging roller, configured to charge the photosensitive drum; and the chip according to any feasible implementation manner in the first aspect and the second aspect mentioned above.

The seventh aspect of exemplary embodiments of the present application provides an image forming apparatus, including:

a plurality of consumables;

a chipset, where the chipset includes a plurality of chips, each chip of the plurality of chips is installed on one of the plurality of consumables, and a chip of the plurality of chips includes an installation detecting terminal and a chip controller;

an installation detecting pin, configured to be electrically connected to the installation detecting terminal of the chip;

an image forming controller, configured to set the installation detecting pin to be at a high level; and a chip controller, configured to control the installation detecting terminal to output a low level, where time points for installation detecting terminals of the plurality of chips to output low levels are different from each other.

It should be understood that, in embodiments of the present disclosure, the plurality of chips is configured to be electrically connected to the image forming apparatus through the same communication bus; the communication bus is configured to detect whether the contact between the image forming apparatus and the chip communication interface of the consumable is desired before normal communication between the image forming apparatus and the chip of the consumable; and time points for the installation detection terminals of all chips to output low levels are configured to be different from each other to ensure that the image forming apparatus receives low levels outputted from the plurality chips in different time points. Therefore, the time points for forming the current loops between the plurality of chips and the image forming apparatus may be different from each other, which avoids the signal conflict problem, and increase accuracy and reliability of detecting whether the image forming apparatus is in a desired contact with the communication connection interface of each of the plurality of chips.

DETAILED DESCRIPTION

Figure 1:
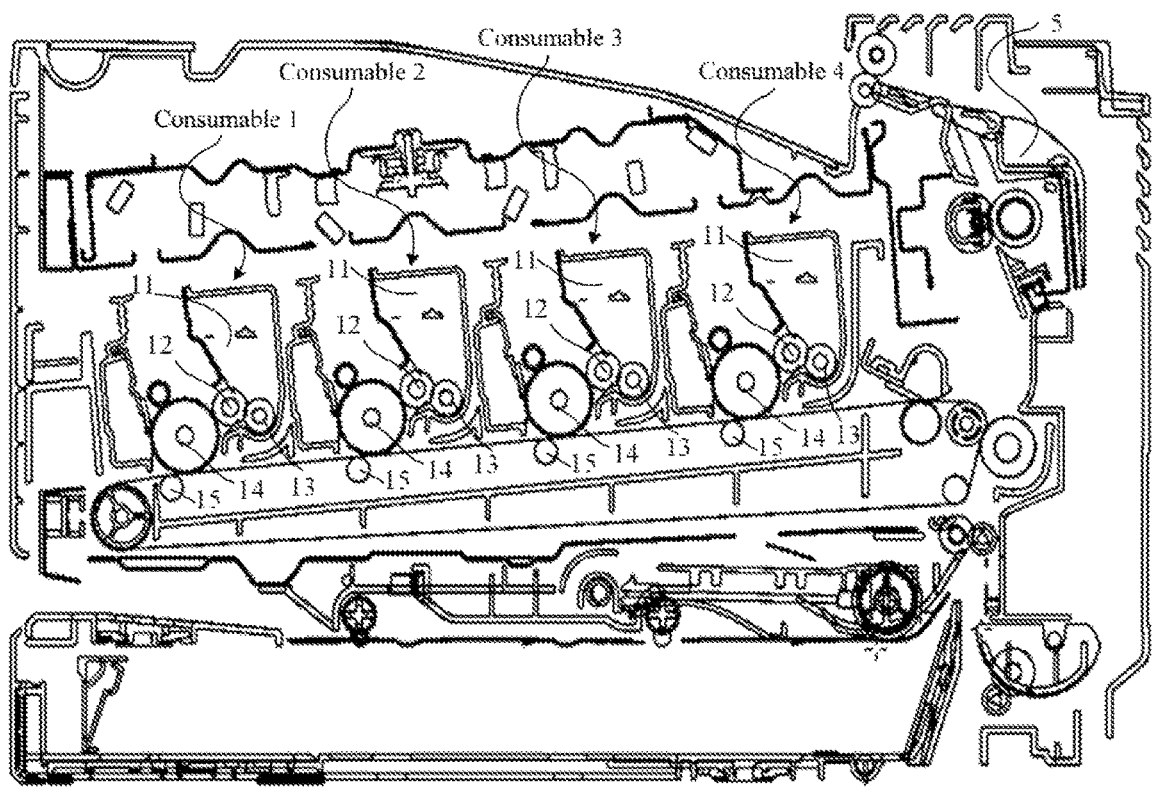
FIG. 1 illustrates a structural schematic of an image forming apparatus provided by exemplary embodiments of the present disclosure.

In order to better understand the technical solutions of the present disclosure, embodiments of the present disclosure are described in detail with reference to the accompanying drawings hereinafter.

It should be noted that described embodiments are only a part of embodiments of the present disclosure, rather than all of embodiments. Based on embodiments of the present disclosure, all other embodiments obtained by those skilled in the art without creative work shall fall within the protection scope of the present disclosure.

In the present disclosure, "at least one" refers to one or more, and "plurality of" refers to two or more. "And/or" describes the association relationship of associated objects, indicating that there can be three relationships. For example, A and/or B may indicate A alone, A and B at a same time, and B alone, where A and B may be singular or plural. The character "/" may normally indicate that the associated objects before and after "/" are in an "or" relationship. "At least one of following items (objects)" or similar expressions refers to any combination of these items, including any combination of a single item (object) or a plurality of items (objects). For example, at least one of a, b, or c may indicate: a, b, c, ab, ac, bc, or abc, where a, b, and c may be one or multiple.

Embodiments of the present disclosure relate to the communication between an image forming apparatus and a chip of a consumable. Both the main body side of the image forming apparatus and the chip side may include electrical contacting portions. When the electrical contacting portion at the main body side of the image forming apparatus and the electrical contacting portion at the chip side are in a desired contact, data may be stably transmitted between the image forming apparatus and the chip. The electrical contacting portions may include a conductive plane, a conductive probe, a conductive coil, and the like.

In order to distinguish the electrical contacting portion at the main body side of the image forming apparatus from the electrical contacting portion at the chip side, in embodiments of the present disclosure, the electrical contacting portion at the main body side of the image forming apparatus is also referred to as a pin at the main body side of the image forming apparatus, and the electrical contacting portion at the chip side is referred to as a terminal at the chip side.

In addition, it should be noted that in embodiments of the present disclosure, the installation detecting pin at the main body side of the image forming apparatus may be a pin disposed on the main body of the image forming apparatus, or may be a pin disposed on an transferring/connecting element, where the transferring/connecting element may extend from the main body of the image forming apparatus, and be attached to the main body of the image forming apparatus.

In order to achieve desired communication between the consumable and the image forming apparatus, there is a need to detect whether the consumable is in a desired contact with the image forming apparatus. Specifically, after the chip is powered on, a low level may be generated to the image forming apparatus, such that a current loop may be formed between the chip and the image forming apparatus, and the image forming apparatus may determine whether the image forming apparatus is in a desired contact with the chip according to the electrical parameter of the current loop.

The image forming apparatuses may be configured to perform image forming tasks, such as generating, printing, receiving, and sending image data, and the image forming apparatuses may exemplarily include inkjet printers, laser printers, LED (light emitting diode) printers, copiers, scanners, multi-functional all-in-one fax machines, and/or multi-functional peripherals that perform the above-mention functions in a single device.

The image forming apparatus may include a controller and an image forming portion, where the controller may be configured to control the entire image forming apparatus, and the image forming portion may be configured to form images on conveyed papers under the control of the controller based on the image data.

FIG. 1 illustrates a structural schematic of an image forming apparatus provided by exemplary embodiments of the present disclosure.

Referring to FIG. 1, as an example of an image forming apparatus, the image forming portion of the image forming apparatus may include a developer accommodating portion 11, a developing element 12, a developer conveying element 13, a photosensitive element 14, a transfer member 15, and a fixing assembly 5. After papers to be printed move along a paper feeding direction, and passes through the toner feeding operation of the developer conveying element 13 and the developing operation of the developing element 12 in sequence, the papers to be printed may reach the holding area between the photosensitive element 14 and the transfer member 15 for transfer printing, and then the papers to be printed may pass the fixing assembly 5 for fixing, thereby completing the image forming operation. The developer accommodating portion 11 may be configured to accommodate a developer. The developer may be a material including toner and the like; the developing element 12 may include a developing roller and the like; the developer conveying element 13 may include a toner feed roller and the like; the developer conveying element 13 may include a toner feed roller and the like; and a photosensitive element 14 may include a photosensitive drum (e.g., organic photoconductor drum (OPC)), a charging roller, and the like, where the charging roller may be configured to charge the photosensitive drum.

Normally, the image forming apparatus may be detachably installed with at least one consumable. Take the image forming apparatus shown in FIG. 1 as an example, the image forming apparatus may be detachably installed with 4 consumables (a consumable 1, a consumable 2, a consumable 3, and a consumable 4 respectively shown in FIG. 1). Four consumables may be configured to provide the image forming apparatus with developers with four colors including black K, cyan C, magenta M, and yellow Y. Obviously, in other embodiments, the number of consumables installed in the image forming apparatus may be increased or decreased, for example, may be 5 or 6 (even more or less), and the like, which may not be limited in the present disclosure. The present disclosure may mainly be applied to scenarios where the number of consumables installed in the image forming apparatus is greater than or equal to two.

The chip may be, specifically, a circuit substrate installed on the consumable. The circuit substrate may include a storage device and contacting terminals connected to the storage device, and the contacting terminals may be configured for point-to-point connection with the pins on the side of the image forming apparatus.

For the consumable installed with the chip, an implementation manner may be that the consumable may only include the developer accommodating portion 11.

An implementation manner may be that the consumable may be a split structure. For example, the consumable (1, 2, 3, or 4) may include a developing cartridge and a drum assembly which can be detached from each other. The developing cartridge may include a housing, the developer accommodation portion 11, the developing element 12 and/or the developer conveying element 13; and the drum assembly may include the photosensitive element 14 including the photosensitive drum and the charging roller.

The developer accommodating portion 11 may be disposed in the housing for accommodating the developer. The developer conveying element 13 may be configured to convey the developer to the developing element 12, and the developing element 12 may be configured to convey the developer to the photosensitive drum, where the developer conveying element may be a toner feeding roller, or another component such as a toner pushing screw and the like.

In an implementation manner, the consumable may be the above-mentioned developing cartridge.

In an implementation manner, the consumable material may be the above-mentioned drum assembly.

In an implementation manner, the consumable may be an integrated structure. For example, the consumable (1, 2, 3, or 4) may include the developer accommodating portion 11, the developing element 12, the developer conveying element 13, the photosensitive element 14, and the like.

Figure 2:
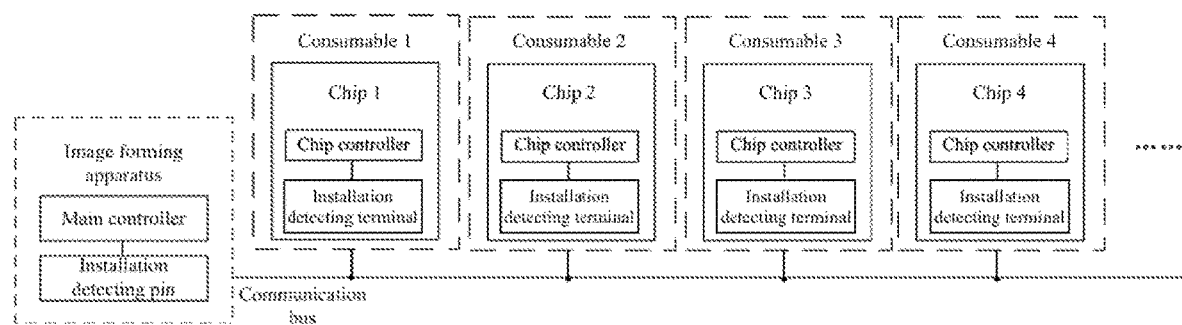
FIG. 2 illustrates a structural block diagram of an image forming system provided by exemplary embodiments of the present disclosure.

FIG. 2 illustrates a structural block diagram of an image forming system provided by exemplary embodiments of the present disclosure.

To solve the problems in the existing technology, the present disclosure provides an image forming system including an image forming apparatus and M consumables (e.g., the consumable 1, the consumable 2, the consumable 3, and the consumable 4 shown in FIG. 2). The M consumables may be detachably installed on the image forming apparatus; and each of the M consumables may include at least a chip (e.g., as shown in FIG. 2, the consumable 1 may include a chip 1, the consumable 2 may include a chip 2, the consumable 3 may include a chip 3, and the consumable 4 may include a chip 4). Obviously, each consumable may further include other chips in addition to the chip shown in FIG. 2.

The image forming apparatus may include a main controller and installation detecting pin. The M chips may include installation detecting terminals and chip controllers; the M chips may be powered by the image forming apparatus; and when the image forming apparatus is powered on, the M chips may be powered on simultaneously. The M chips may also be electrically connected to the main controller and the installation detecting pin of the image forming apparatus through a same communication bus.

The installation detecting terminal may be configured to be electrically connected to the installation detecting pin through the communication bus; and the chip controller may be configured to control the installation detecting terminal of the chip to output a low level to the installation detecting pin after the chip is powered on, such that a current loop may be formed between the chip and the image forming apparatus, where the time points for the installation detecting terminals of all chips in the M chips to output low levels may be different from each other.

Furthermore, each of the M chips may further include a storage unit configured to store a time control parameter; and the time control parameter may be configured to control the time point for the installation detecting terminal to output a low level.

The time point for the installation detecting terminal of the chip to output the low level may be specifically the time point for the chip and the image forming apparatus to form the current loop according to the low level outputted by the installation detecting terminal of the chip, and/or the time point for the image forming apparatus to detect the electrical parameter in the current loop formed between the chip and the image forming apparatus, which may not be limited herein.

It should be noted that the time point for the installation detecting terminal of the chip to output the low level may refer to the time point for the chip controller to specifically control the installation detecting terminal of the chip to output the low level after the chip is powered on.

The time points for the installation detecting terminals of all chips in the M chips to output low levels may be different from each other, which may be mainly characterized as that the time durations from power-on to the installation detecting terminal outputting low levels corresponding to the M chips may be different from each other.

In the present disclosure, the time point for the installation detecting terminal of the chip to output the low level may be controlled based on the time control parameter stored in the chip, such that the time point for the chip to output the low level may be controlled according to actual needs. In other words, it may effectively ensure that the time points for the installation detecting terminals of the plurality of chips to output low levels may be different from each other. Therefore, the signal conflict problem in the existing technology may be effectively avoided, and the accuracy and reliability of detecting whether the image forming apparatus is in a desired contact with the communication connection interfaces of the plurality of chips may be increased.

In an implementation manner, the configuration information of a corresponding installation detecting terminal may be directly modified through the controller 410, such that the installation detecting terminal may directly output a low-level signal, thereby configuring the installation detecting terminal to be at the low level.

Those skilled in the art should understand that the present disclosure does not limit the manner in which the installation detecting terminal is configured to be at the low level.

The main controller of the image forming apparatus may determine whether each chip is in a desired contact with the image forming apparatus according to the electrical parameter of the current loop formed between each chip and the image forming apparatus, where M is a natural number greater than or equal to 2.

It should be understood that, in embodiments of the present disclosure, the M chips may be configured to be electrically connected to the image forming apparatus through a same communication bus, whether the image forming apparatus is in a desired contact with the chip communication interface of each consumable before the normal communication between the image forming apparatus and the chip of the consumable may be detected through the communication bus, and the time points for the installation detecting terminals of all chips to output low levels may be configured to be different from each other. In such way, it may ensure that the image forming apparatus may receive low levels outputted from a plurality of chips in different time points to avoid the signal conflict problem, the time points for forming the current loops between all chips and the image forming apparatus may be different from each other, and the accuracy and reliability of detecting whether the image forming apparatus is in a desired contact with the communication connection interfaces of the plurality of chips may be increased.

The main controller may be a system on chip (SoC) which is a miniature system including multiple system components, configured to control image forming processing operations of the image forming apparatus; and for example, the operations may include processing, such as performing linear correction, noise reduction, dead pixel removal, detail enhancement, and the like on image data to improve the image output quality. The main controller may further be configured to perform data transmission and reception, command transmission and reception, and engine control related processing operations for printing portraits. For example, the main controller may be configured to perform the operations including transmitting and receiving data, and printing engine control commands, statuses and the like through an interface unit (may include, but may not be limited to, a USB port, a wired network port, a wireless network port, other interfaces, and/or the like).

The communication bus may specifically be an SPI (serial peripheral interface) bus. The SPI bus may be a full-duplex synchronous serial interface standard with high transmission efficiency.

Figure 3:
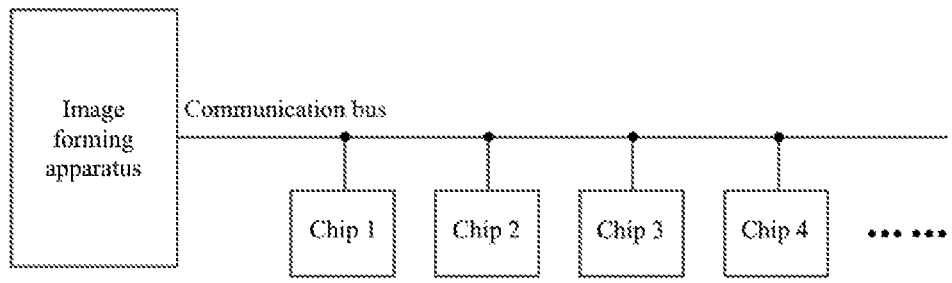
FIGS. 3-5 illustrate schematics of connection manners of an image forming apparatus and chips provided by exemplary embodiments of the present disclosure.
Figure 4:
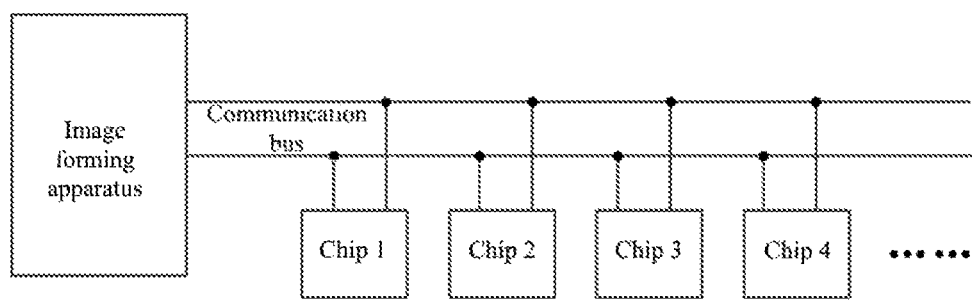
Figure 5:
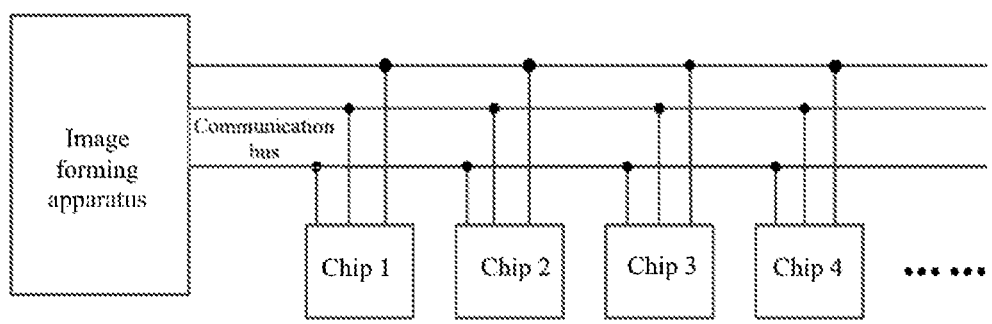

FIGS. 3-5 illustrate schematics of connection manners of an image forming apparatus and chips provided by exemplary embodiments of the present disclosure.

In some embodiments of the present disclosure, the connection manners between the image forming apparatus and all chips may include the following manners.

At connection manner one, as shown in FIG. 3, the connection manner between the image forming apparatus and all chips (e.g., the consumable 1, the consumable 2, the consumable 3, and the consumable 4) may be a single bus connection; a time-sharing multiplex bus may be configured between the image forming apparatus and all chips; and the main controller of the image forming apparatus may communicate with all chips according to features of a single-wire protocol.

At connection manner two, as shown in FIG. 4, the connection manner between the image forming apparatus and all chips (e.g., the consumable 1, the consumable 2, the consumable 3, and the consumable 4) may be a two wire bus connection; and the main controller of the image forming apparatus may communicate with all chips according to features of a two wire bus protocol.

At connection manner three, as shown in FIG. 5, the connection manner between the image forming apparatus and all chips (e.g., the consumable 1, the consumable 2, the consumable 3, and the consumable 4) may be a multi-wire bus connection; and the main controller of the image forming apparatus may communicate with all chips according to features of a multi-wire bus protocol.

In order to make the time points for the installation detecting terminals of all chips of the M chips to output low levels to be not same, embodiment of the present disclosure may provide the following implementation manners.

Implementation Manner One

Figure 6:
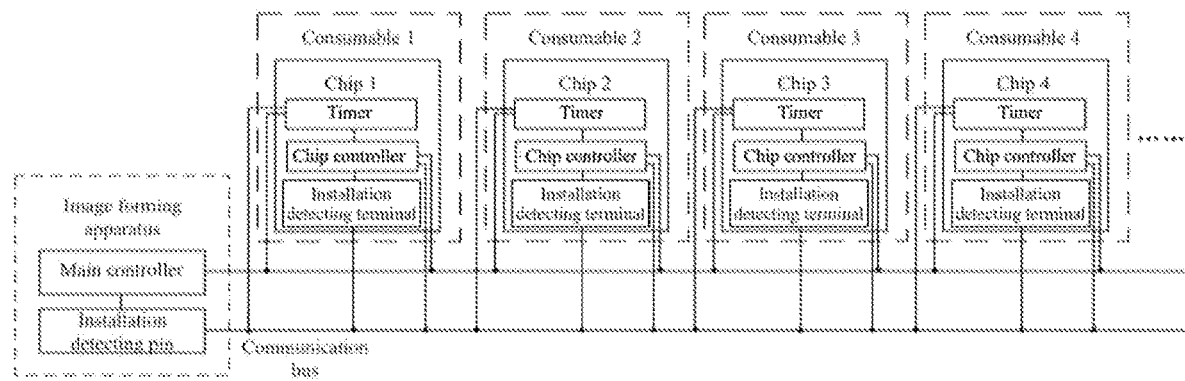
FIG. 6 illustrates another structural block diagram of an image forming system provided by exemplary embodiments of the present disclosure.

As shown in FIG. 6, each of the M chips may further include a timer. After the image forming apparatus is powered on, the main controller may generate a clock synchronization signal and transmit the clock synchronization signal to the timer of each chip through the communication bus, and the timer may receive the clock synchronization signal and start timing from zero; or the clock synchronization signal may be transmitted to the chip controller of each chip through the communication bus, and after the chip controller receives the clock synchronization signal, the clock synchronization signal may be transmitted to the timer.

After receiving the clock synchronization signal, the timer of each chip may start timing from zero. When the timing value reaches a corresponding preset first timing value, the chip controller of each chip may control the installation detecting terminal of each chip to output the low level to the installation detecting pin. The preset first timing values corresponding to the M chips may be different from each other, and the difference between two preset first timing values corresponding to two adjacent chips in the order of outputting low levels may be greater than a preset threshold, which ensures that the time points for forming the current loops between the M chips and the image forming apparatus may be different from each other. The configuration of the preset threshold may be related to the batch, main frequency, and power-on initialization time of the chip, which may not be limited herein.

It should be understood that, in the first implementation manner, each chip may be configured to have a different response time duration after receiving the clock synchronization signal of the main controller by setting a clock synchronization mechanism, such that the time points for all the chips to generate the low levels may be different from each other, which may be suitable for the scenario where the main frequency difference of all chips is not large, or the main frequency difference of all chips is large, but the delay time difference corresponding to all chips is small.

Figure 7:
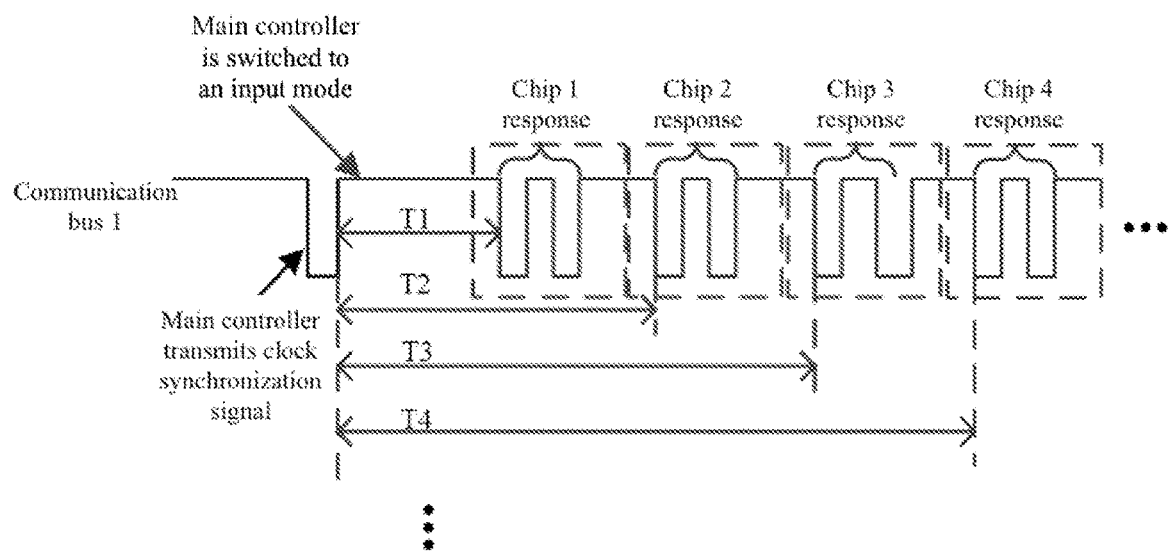
FIG. 7 illustrates a signal sequence diagram of a main controller and chips provided by exemplary embodiments of the present disclosure.

Specifically, the connection mode between the image forming apparatus and all chips using a single bus connection may be taken as an example. As shown in FIG. 7, when the image forming apparatus and all chips are connected by a single bus (for example, the communication bus 1 as shown in FIG. 7), after the image forming apparatus is powered on, the main controller may generate the clock synchronization signal and transmit the clock synchronization signal to the timer of each chip through the communication bus 1. When the timing value of the timer reaches the preset first timing value corresponding to each chip, the chip controller of each chip may control a corresponding installation detecting terminal to return the low level to the installation detecting pin through the communication bus 1, such that the current loop may be formed between each chip and the image forming apparatus. As shown in FIG. 7, the preset first timing value corresponding to the chip 1 (that is, the response time of the chip 1 after receiving the clock synchronization signal) is T1; the preset first timing value corresponding to the chip 2 (that is, the response time of the chip 2 after receiving the clock synchronization signal) is T2; the first preset timing value corresponding to the chip 3 (that is, the response time of the chip 3 after receiving the clock synchronization signal) is T3; the preset first timing value corresponding to the chip 4 (that is, the response time of the chip 4 after receiving the clock synchronization signal) is T4, and the like. In one embodiment, T4>T3>T2>T1, and T2 may be greater than T1+THS (e.g., THS is a preset time duration), T3 may be greater than T2+THS, and T4 may be greater than T3+THS, where the setting of THS may be related to the batch, main frequency, and power-on initialization time of the chip.

Figure 8:
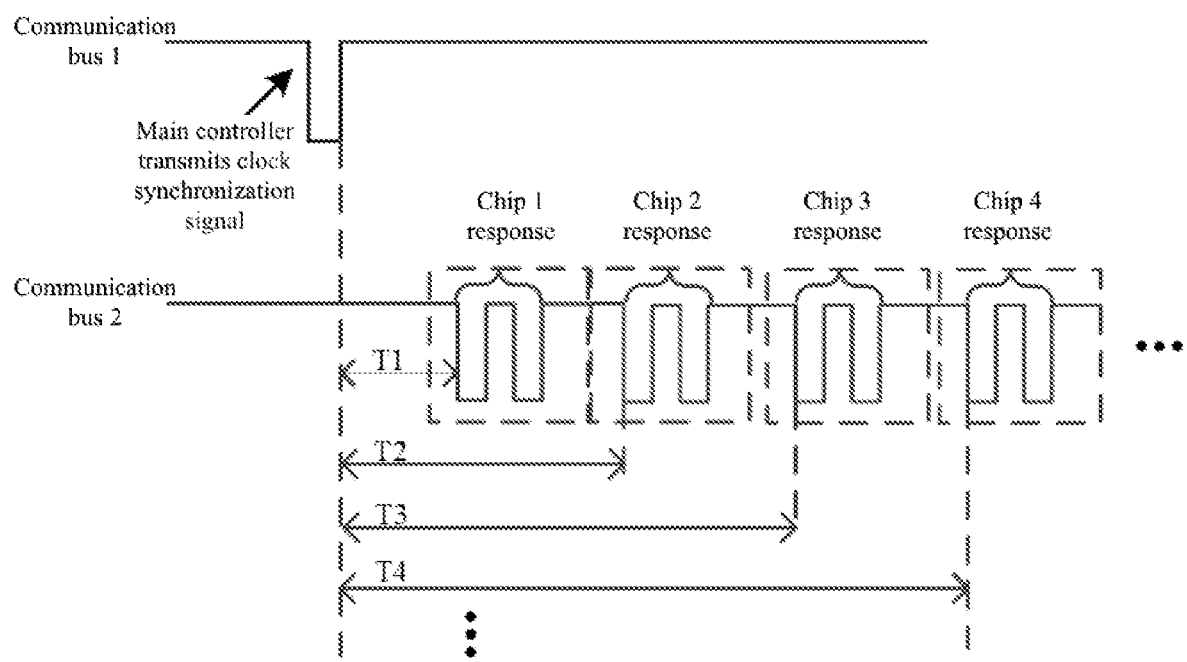
FIG. 8 illustrates another signal sequence diagram of a main controller and chips provided by exemplary embodiments of the present disclosure.
Figure 9:
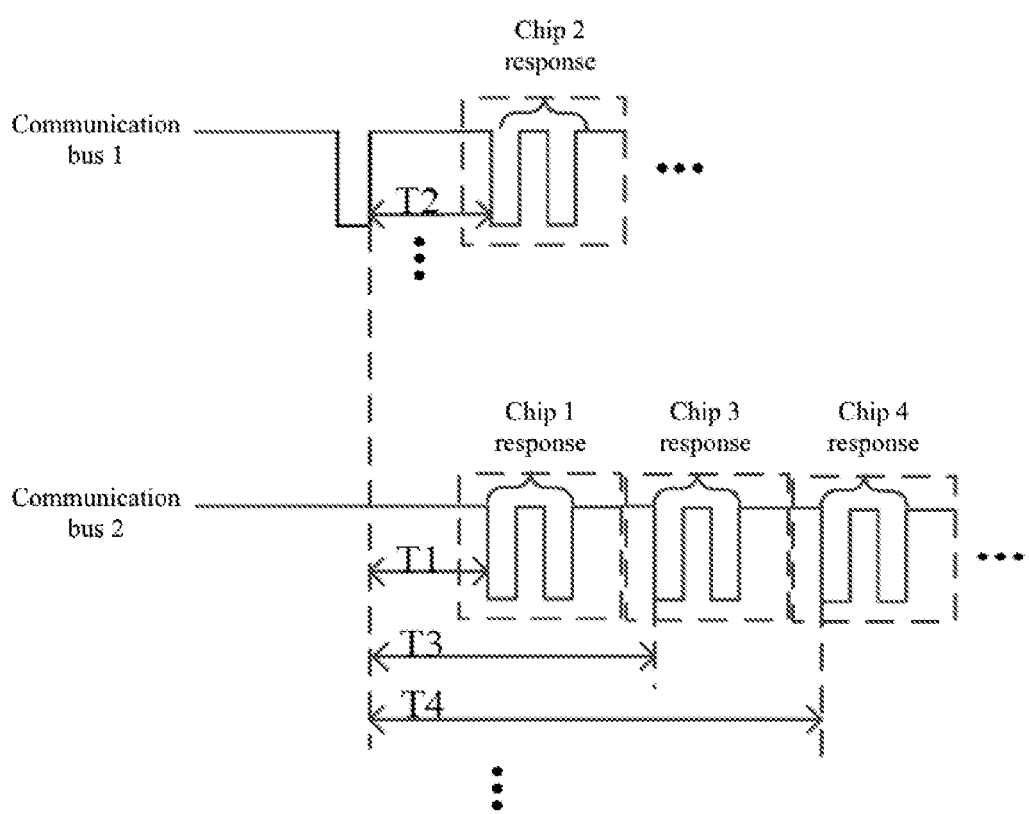
FIG. 9 illustrates another signal sequence diagram of a main controller and chips provided by exemplary embodiments of the present disclosure.

The connection mode between the image forming apparatus and all chips using the 2 wire bus connection may be taken as an example. As shown in FIGS. 8-9, when the connection between the image forming apparatus and all chips is the 2 wire bus connection (the communication bus 1 and the communication bus 2), after the image forming apparatus is powered on, the main controller may generate the clock synchronization signal and transmit the clock synchronization signal to the timer of each chip through one communication bus (e.g., the communication bus 1 shown in FIGS. 8-9) of the communication bus 1 and the communication bus 2. When the timing value of the timer of each chip reaches the preset first timing value corresponding to the chip, the chip controller of the chip may control a corresponding installation detecting terminal to generate the low level and return the low level to the installation detecting pin through the other communication bus (e.g., the communication bus 2 as shown in FIG. 8) of the communication bus 1 and the communication bus 2, such that the current loop may be formed between each chip and the image forming apparatus. Or as shown in FIG. 9, the low levels generated by a part of the chips (e.g., the chip 2) may be returned to the main controller through the communication bus 1, and the low levels generated by another part of the chips (e.g., the chip 1, the chip 3, and the chip 4) may be returned to the installation detecting pin through the communication bus 2.

Figure 10:
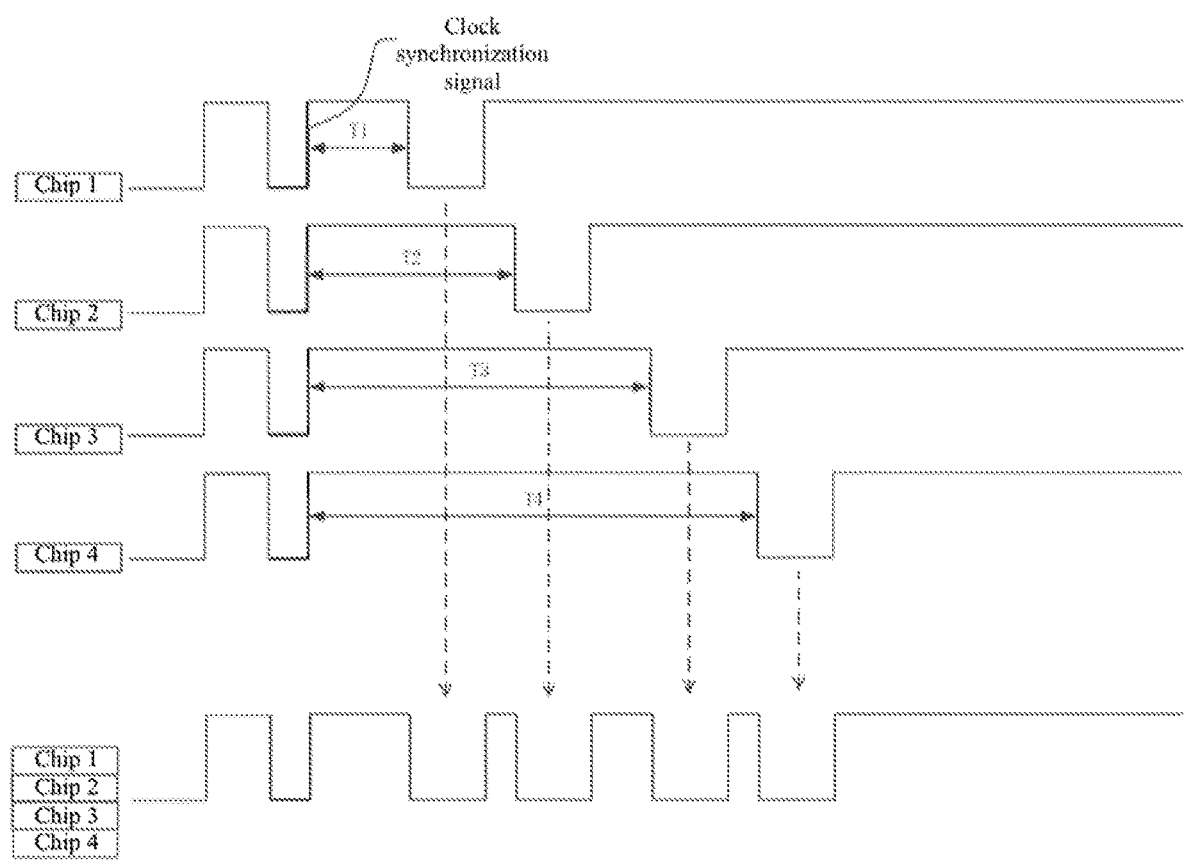
FIG. 10 illustrates another signal sequence diagram of a main controller and chips provided by exemplary embodiments of the present disclosure.

As shown in FIGS. 8-10, the preset first timing value corresponding to the chip 1 (that is, the response time of the chip 1 after receiving the clock synchronization signal) is T1; the preset first timing value corresponding to the chip 2 (that is, the response time of the chip 2 after receiving the clock synchronization signal) is T2; the preset first timing value corresponding to the chip 3 (that is, the response time of the chip 3 after receiving the clock synchronization signal) is T3; and the preset first timing value corresponding to the chip 4 (that is, the response time of the chip 4 after receiving the clock synchronization signal) is T4.

As shown in FIGS. 8-10, the clock synchronization signal may specifically be a rising or falling edge generated by the main controller on a signal line (clk line or data line). Specifically, the clock synchronization signal may be the rising or falling edge of a pulse signal generated by the main controller on the signal line (clk line or data line). Optionally, the clock synchronization signal may be the rising edge or the falling edge of a clock signal generated by the main controller on the clk line.

The timer may be configured inside the chip controller, or configured independently from the chip controller and electrically connected to the chip controller, which may be specifically configured to measure time information. The specific form of the timer may not be limited in the present disclosure, and may be hardware, software, or a combination of software and hardware, which may be within the scope of the present disclosure as long as the timing function is implemented.

Each of the M chips may further include a first storage unit; and the first storage unit may pre-store the preset first timing value of a corresponding chip. Or, each of the M chips may further include a second storage unit; the second storage unit may pre-store its own color feature value and a lookup table that stores the corresponding relationship between a plurality of color feature values and a plurality of preset timing values; and each chip may determine its corresponding preset first timing value according to its own color feature value and the lookup table. The first storage unit and/or the second storage unit may be configured inside the chip controller, or may be configured independently form the chip controller.

The chip 1, chip 2, chip 3, and chip 4 shown in FIG. 10 may correspond to consumables for supplying developers with colors including black K, cyan C, magenta M, and yellow Y, respectively.

Implementation Manner Two

As shown in FIG. 6, each of the M chips may further include the timer. After the image forming apparatus is powered on, the main controller may generate the clock synchronization signal and transmit the clock synchronization signal to the timer of each chip through the communication bus, and the timer may receive the clock synchronization signal and start timing from zero; or the clock synchronization signal may be transmitted to the chip controller of each chip through the communication bus, and after the chip controller receives the clock synchronization signal, the clock synchronization signal may be transmitted to the timer. The above-mentioned clock synchronization signal may also be replaced with a power-on signal or a preset control command, which may not be limited herein.

The timer of the first chip in the M chips may start timing from zero after satisfying a preset condition. When the timing value of the timer of the first chip reaches a corresponding preset second timing value, the chip controller of the first chip may control the installation detecting terminal of the first chip to output the low level to the installation detecting pin. Satisfying the preset condition may be detecting that 0 chip outputs the low level, and/or receiving one of the clock synchronization signal, the power-on signal, and the preset control instruction of the image forming apparatus.

The timer of an a-th chip in the M chips may start timing from zero after detecting the low level outputted by an (a-1)-th chip. When the timing value of the timer of the a-th chip reaches a corresponding preset second timing value, the chip controller of the a-th chip may control the installation detecting terminal of the a-th chip to output the low level to the installation detecting pin, where a may be less than or equal to M and a may be a natural number greater than or equal to 2.

It should be understood that the synchronization mechanism may be configured in the second implementation manner, the timer of the first chip of the M chips may start timing from zero after satisfying the above-mentioned preset condition, the timer of each of other chips in the M chips may be triggered to start timing by the low level generated by a corresponding previous chip, and when the timing reaches a corresponding second timing value, the low level may be generated again. Therefore, it may ensure that the time points for the M chips to generate the low levels may be different from each other; furthermore, the time points for forming the current loops between M chips and the image forming apparatus may be different from each other.

Figure 11:
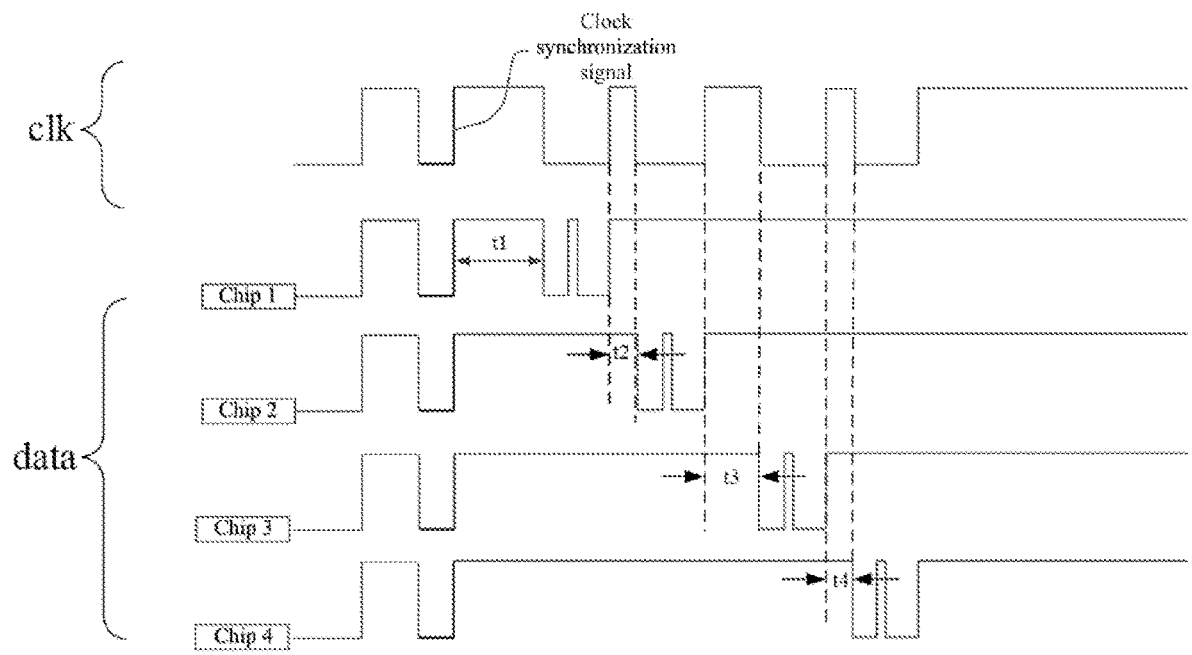
FIG. 11 illustrates another signal sequence diagram of a main controller and chips provided by exemplary embodiments of the present disclosure.

Taking the quantity of chips is 4 as an example, the M chips may include the chip 1, the chip 2, the chip 3, and the chip 4. The chip 1, the chip 2, the chip 3, and the chip 4 shown in FIG. 11 may correspond to developer consumables with colors including black K, cyan C, magenta M, and yellow Y, respectively. t1, t2, t3, and t4 shown in FIG. 11 may respectively correspond to the preset second timing value of the chip 1, the preset second timing value of the chip 2, the preset second timing value of the chip 3 and the preset second timing value of the chip 4.

In an specific implementation, after the image forming apparatus is powered on, the main controller may generate the clock synchronization signal and transmit the clock synchronization signal to the timer of each chip through the communication bus.

The timer of the chip 1 may start timing from zero after receiving the clock synchronization signal. When the timing value of the timer of the chip 1 reaches the corresponding preset second timing value (i.e., t1), the chip controller of the chip 1 may control the installation detecting terminal of the chip 1 to output a low level to the installation detecting pin through the communication bus, such that a current loop may be formed between the chip 1 and the image forming apparatus.

The timer of the chip 2 may start timing from zero after detecting low level for one time. When the timing value of the timer of the chip 2 reaches the corresponding preset second timing value (i.e., t2), the chip controller of the chip 2 may control the installation detecting terminal of the chip 2 to output a low level to the installation detecting pin through the communication bus, such that a current loop may be formed between the chip 2 and the image forming apparatus.

The timer of the chip 3 may start timing from zero after detecting low level for two times. When the timing value of the timer of the chip 3 reaches the corresponding preset second timing value (i.e., t3), the chip controller of the chip 3 may control the installation detecting terminal of the chip 3 to output a low level to the installation detecting pin through the communication bus, such that a current loop may be formed between the chip 3 and the image forming apparatus.

The timer of the chip 4 may start timing from zero after detecting low level for three times. When the timing value of the timer of the chip 4 reaches the corresponding preset second timing value (i.e., t4), the chip controller of the chip 4 may control the installation detecting terminal of the chip 4 to output a low level to the installation detecting pin through the communication bus, such that a current loop may be formed between the chip 4 and the image forming apparatus.

The preset timing value corresponding to each chip may be same or different, which may be set flexibly according to actual needs.

It should be noted that if the quantity of chips is not 4, the configuration may also be adjusted according to the above-mention rules.

Each of the M chips may further include a third storage unit, and the third storage unit may pre-store a preset second timing value and a preset first chip-quantity of a corresponding chip. Or, each of the M chips may further include a fourth storage unit. The fourth storage unit may pre-store its own color feature value and a lookup table that stores the corresponding relationship between a plurality of color feature values, a plurality of preset timing values, and a plurality of preset chip-quantities. Each chip may determine its corresponding preset second timing value and preset chip-quantity according to its own color feature value and the lookup table. The number of the above-mentioned lookup tables may be one or multiple. The multiple lookup tables may include, for example, a first lookup table that stores the corresponding relationship between a plurality of color feature values and a plurality of preset timing values, and a second lookup table that stores the corresponding relationship between a plurality of color feature values and a plurality of preset chip-quantities, which may not be limited herein. The third storage unit and/or the fourth storage unit may be configured inside the chip controller, or may be configured separately and independently from the chip controller.

The above-mentioned preset chip-quantity or preset first chip-quantity may be configured to indicate the quantity of low levels that have detected, and/or configured to indicate the quantity of chips that have outputted low levels, which may not be limited herein.

In an optional implementation manner, it is assumed that the chip that outputs a low level first among the M chips is a chip A, the chip A may not include a timer, and the chip controller of chip A may acquire the quantity of chips that have outputted low levels. When the quantity of chips that have outputted low levels is 0, after receiving the clock synchronization signal or the preset control instruction transmitted by the image forming apparatus, the chip controller of the chip A may control the installation detecting terminal of the chip A to output a low level; or when the quantity of chips that have outputted low levels is 0, the chip controller of the chip A may directly control the installation detecting terminal of the chip A to output a low level. At this point, the storage unit of the chip A may directly store a preset first chip-quantity, and the preset first chip-quantity may be 0, or may store its own color feature value and a lookup table that stores the corresponding relationship between a plurality of color feature values and a plurality of preset chip-quantities. The chip A may determine that the preset first chip-quantity corresponding to the chip A is 0 according to its own color feature value and the above-mentioned lookup table.

Implementation Manner Three

As shown in FIG. 2, when the image forming apparatus is powered on, the main controller may generate the power-on signal, or the preset control command, or the clock synchronization signal, and transmit the power-on signal, or the preset control command, or the clock synchronization signal to the chip controller of each chip.

After receiving the power-on signal, or the preset control instruction, or the clock synchronization signal, the chip controller of the first chip of the M chips may control the installation detecting terminal of the first chip to output a low level to the main controller.

After receiving the low level outputted by the (a-1)-th chip, the chip controller of the a-th chip of the M chips may control the installation detecting terminal of the a-th chip to output a low level to the installation detecting pin, where a may be less than or equal to M and a may be a natural number greater than or equal to 2.

It should be understood that, in the third implementation manner, a next chip may be controlled to generate a low level after a previous chip generates a low level, thereby ensuring that the time points for the M chips to generate the low levels may be different from each other; and furthermore the time points for forming the current loops between the M chips and the image forming apparatus may be different from each other. Meanwhile, the timer and the storage unit for storing first timing values/second timing values or a lookup table for storing the corresponding relationship between a plurality of color feature values and a plurality of first timing values/second timing values may not need to be configured in implementation manner three, which may save hardware cost and storage space.

Figure 12:
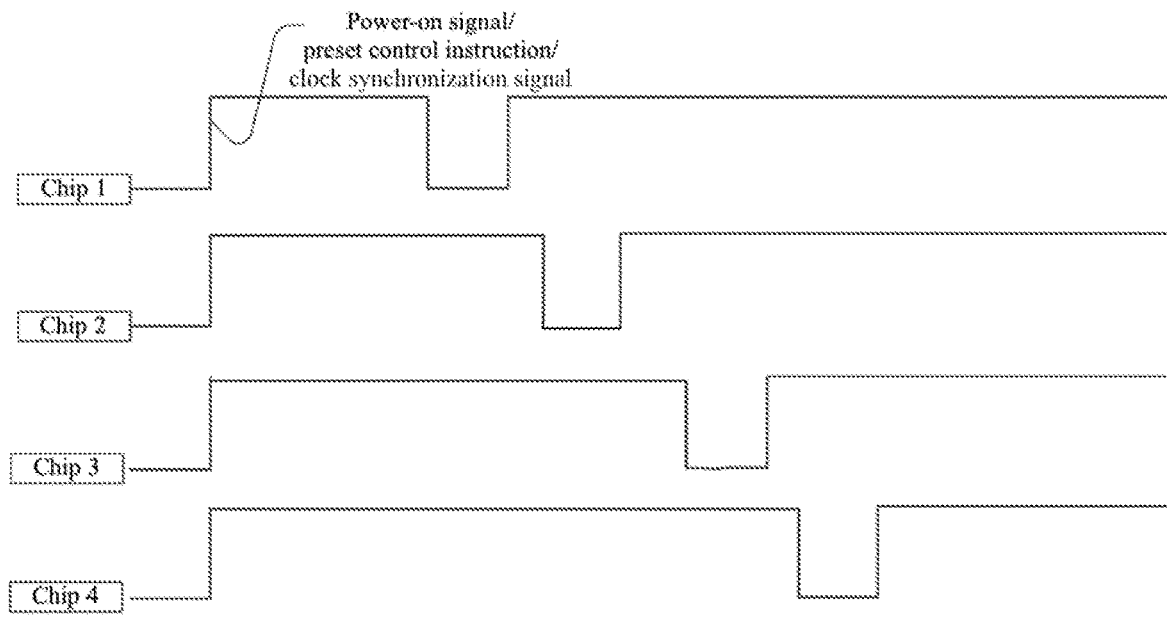
FIG. 12 illustrates another signal sequence diagram of a main controller and chips provided by exemplary embodiments of the present disclosure.

The chip 1, the chip 2, the chip 3, and the chip 4 shown in FIG. 12 may correspond to consumables for supplying developers with colors including black K, cyan C, magenta M, and yellow Y, respectively.

Taking the quantity of chips is 4 as an example, the M chips may include the chip 1, the chip 2, the chip 3, and the chip 4. In a specific implementation, after the image forming apparatus is powered on, the main controller may generate the power-on signal, or the preset control command, or the clock synchronization signal, and may transmit the power-on signal, or the preset control command, or the clock synchronization signal to the chip controller of each chip through the communication bus.

In a specific implementation, when the chip controller of the chip 1 receives the power-on signal, or the preset control instruction, or the clock synchronization signal, the installation detecting terminal of the chip 1 may be controlled to output the low level to the installation detecting pin through the communication bus, such that a current loop may be formed between the chip 1 and the image forming apparatus.

After the chip controller of the chip 2 detects low level for one time, the installation detecting terminal of the chip 2 may be controlled to output the low level to the installation detecting pin through the communication bus, such that a current loop may be formed between the chip 2 and the image forming apparatus.

After the chip controller of the chip 3 detects low level for two times, the installation detecting terminal of the control chip 3 may be controlled to output the low level to the installation detecting pin through the communication bus, such that a current loop may be formed between the chip 3 and the image forming apparatus.

After the chip controller of chip 4 detects low level for three times, the installation detecting terminal of the control chip 4 may be controlled to output the low level to the installation detecting pin through the communication bus, such that a current loop may be formed between the chip 4 and the image forming apparatus.

It should be noted that if the quantity of chips is not 4, the configuration may also be adjusted according to the above-mentioned rules.

Each of the M chips may further include a fifth storage unit, and the fifth storage unit may pre-store a corresponding preset second chip-quantity. Or, each of the M chips may further include a sixth storage unit. The sixth storage unit may pre-store its own color feature value and a lookup table storing the corresponding relationship between a plurality of color feature values and a plurality of preset chip-quantities. Each chip may determine its corresponding preset second chip-quantity according to its own color feature value and the lookup table. The fifth storage unit and/or the sixth storage unit may be configured inside the chip controller, or may be configured separately and independently from the chip controller.

The above-mentioned preset chip-quantity or the preset second chip-quantity may be configured to indicate the quantity of low-levels that have detected, and/or configured to indicate the quantity of chips that have outputted low-levels, which may not be limited herein.

In an optional implementation manner, it is assumed that the chip that outputs a low level first among the M chips is a chip B, and the chip controller of the chip B may acquire the quantity of chips that have outputted low levels. When the quantity of chips that have outputted a low level is 0, after receiving the clock synchronization signal or the preset control instruction transmitted by the image forming apparatus, the chip controller of the chip B may control the installation detecting terminal of the chip B to output a low level; or when the quantity of chips that have outputted low level is 0, the chip controller of the chip B may directly control the installation detecting terminal of the chip B to output a low level. At this point, the storage unit of the chip B may directly store the preset first chip-quantity, and the preset first chip-quantity may be 0, or may store its own color feature value and a lookup table that stores the corresponding relationship between a plurality of color feature values and a plurality of preset chip-quantities. The chip B may determine that the preset first chip-quantity corresponding to the chip B is 0 according to its own color feature value and the above-mentioned lookup table.

Implementation Manner Four

Each of the M chips may further include a counter. After the image forming apparatus is powered on, the main controller may generate the clock synchronization signal and transmit the clock synchronization signal to the counter of each chip through the communication bus. When receiving the clock synchronization signal, the counter may count the number of received pulse signals with a preset period from zero, or transmit the clock synchronization signal to the chip controller of each chip through the communication bus. After receiving the clock synchronization signal, the chip controller may transmit the clock synchronization signal to the counter, such that the counter may count the number of received pulse signals from zero.

The counter may be configured inside the chip controller, or independently configured relative to the chip controller and electrically connected to the chip controller; and may be specifically configured to measure the number of clock pulse signals. The specific form of the counter may not be limited in the present disclosure, and may be hardware, software, or a combination of software and hardware, which may be within the scope of the present disclosure as long as the counting function may be implemented. The counter may also be the above-mentioned timer, which may not be limited herein.

Furthermore, the main controller of the image forming apparatus may transmit the clock synchronization signal and the pulse signal to the chip through a signal line (data line or clk line), where the clock synchronization signal may specifically be a rising edge or a falling edge of the pulse signal, which may not be limited herein. Optionally, the pulse signal may be a clock signal transmitted by the main controller of the image forming apparatus to the chip, and the clock synchronization signal may be a rising edge or a falling edge of the clock signal.

Furthermore, the main controller of the image forming apparatus may also transmit the clock synchronization signal and the pulse signal to the chip through different signal lines, that is, transmit the clock synchronization signal to the chip through one of the data line and the clk line, and transmit the pulse signal to the chip through the other signal line of the data line and the clk line. Optionally, the clock synchronization signal may be a rising edge or a falling edge of the clock signal transmitted by the main controller of the image forming apparatus to the chip.

After receiving the clock synchronization signal, the counter of each chip may count the number of received pulse signals from zero. When the count value reaches a corresponding preset count value, the chip controller of each chip may control the installation detecting terminal of each chip to output the low level to the installation detecting pin, where the preset count values corresponding to the M chips may be different from each other. In addition, the difference between the two preset count values corresponding to two adjacent chips in the order for outputting low levels may be greater than a preset threshold, and the main frequency of each chip may be significantly greater than the period of the pulse signal, thereby ensuring that the time points for forming current loops between the M chips and the image forming apparatus may be different from each other. The setting of the preset threshold may be related to the batch, main frequency, and power-on initialization time of the chip, which may not be limited herein.

Taking the quantity of chips is 4 as an example, the M chips may include the chip 1, the chip 2, the chip 3, and the chip 4.

The preset first count value corresponding to the chip 1 (that is, the count value of the chip 1 that counts received pulse signals after receiving the clock synchronization signal) is C1; the preset second count value corresponding to the chip 2 (that is, the count value of the chip 2 that counts received pulse signals after receiving the clock synchronization signal) is C2; the preset third count value corresponding to the chip 3 (that is, the count value of the chip 3 that counts received pulse signals after receiving the clock synchronization signal) is C3; and the preset fourth count value corresponding to the chip 4 (that is, the count value of the chip 4 that counts received pulse signals after receiving the clock synchronization signal) is C4. In one embodiment, C4>C3>C2>C1, and C2 may be greater than C1+CHS, C3 may be greater than C2+CHS, and C4 may be greater than C3+CHS, where the setting of CHS may be related to the batch, main frequency, and power-on initialization time of the chip.

In an specific implementation, after the image forming apparatus is powered on, the main controller may generate the clock synchronization signal and the pulse signal, and transmit the clock synchronization signal and the pulse signal to the counter of each chip through the communication bus.

The counter of the chip 1 may count received pulse signals from zero after receiving the clock synchronization signal. When the count value of the counting period of the chip 1 reaches the corresponding preset first count value (i.e., C1), the chip controller of the chip 1 may control the installation detecting terminal of the chip 1 to output a low level to the installation detecting pin through the communication bus, such that a current loop may be formed between the chip 1 and the image forming apparatus.

The counter of the chip 2 may count received pulse signals from zero after receiving the clock synchronization signal. When the count value of the counting period of the chip 2 reaches the corresponding preset second count value (i.e., C2), the chip controller of the chip 2 may control the installation detecting terminal of the chip 2 to output a low level to the installation detecting pin through the communication bus, such that a current loop may be formed between the chip 2 and the image forming apparatus.

The counter of chip 3 may start counting received pulse signals from zero after receiving the clock synchronization signal. When the count value of the counting period of the chip 3 reaches the corresponding preset third count value (i.e., C3), the chip controller of the chip 3 may control the installation detecting terminal of the chip 3 to output a low level to the installation detecting pin through the communication bus, such that a current loop may be formed between the chip 3 and the image forming apparatus.

The counter of the chip 4 may start counting received pulse signals from zero after receiving the clock synchronization signal. When the count value of the counting period of the chip 4 reaches the corresponding preset fourth count value (i.e., C4), the chip controller of the chip 4 may control the installation detecting terminal of the chip 4 to output a low level to the installation detecting pin through the communication bus, such that a current loop may be formed between the chip 4 and the image forming apparatus.

It should be noted that if the quantity of chips is not 4, the configuration may also be adjusted according to the above-mentioned rules.

Each of the M chips may further include a seventh storage unit, and the seventh storage unit may pre-store a preset count value of a corresponding chip. Or each of the M chips may further include an eighth storage unit; the eighth storage unit may pre-store its own color feature value and a lookup table that stores the corresponding relationship between a plurality of color feature values and a plurality of preset count values; and each chip may determine its own corresponding preset count value according to its own color feature value and the lookup table. The seventh storage unit and/or the eighth storage unit may be configured inside the chip controller, or may be configured independently from the chip controller.

It should be understood that, in the fourth implementation manner, the clock synchronization mechanism may be configured to set that each chip has a different response time after receiving the clock synchronization signal of the main controller, such that the time points for the M chips to generate the low levels may be different form each other, and furthermore the time points for forming the current loops between the M chips and the image forming apparatus may be different from each other. It should also be noted that, in the present disclosure, in order to form a current loop between each chip and the image forming apparatus, it may also be needed to configure the installation detecting pin on the image forming apparatus side to be at a high level.

Various manners may be used to configure the installation detecting pin on the side of the image forming apparatus to be at a high level.

For example, the installation detecting pin on the side of the image forming apparatus may be directly or indirectly connected to the pin with a high level on the side of the image forming apparatus, such as a power supply pin of the printer's main control SoC or a signal pin configured at a high level. Therefore, the installation detecting pin on the side of the image forming apparatus may be configured to be a high level. The above-mentioned indirect access may be connected through components such as impedance elements, switching elements, and the like; and there is no restriction on the indirect connection circuit, as long as the installation detecting pin can be configured to be at a high level.

Those skilled in the art should understand that embodiments of the present disclosure do not limit the manner of how to configure the installation detecting pin to be at a high level.

The contact between the installation detecting pin on the side of the image forming apparatus and the installation detecting terminal on the chip side may normally have three cases.

At the first case, the pin at the side of the image forming apparatus may be completely disconnected from the terminal at the chip side; and in such case, the image forming apparatus and the chip may not communicate completely.

At the second case, the pin at the side of the image forming apparatus may be in a desired contact with the terminal at the chip side; and in such case, the image forming apparatus and the chip may communicate with each other stably. That is, when the contact between the chip and the image forming apparatus is desired, the communication state between the chip and the image forming apparatus is stable. In other words, the data transmission between the chip and the image forming apparatus may not experience data transmission failures such as data distortion, data transmission interruption, and the like.

At the third case, the pin at the side of the image forming apparatus may be in contact with the terminal at the chip side but a poor contact problem may occur. In such case, the image forming apparatus and the chip may communicate with each other, but the communication state may not be sufficiently stable. In other words, the data transmission between the chip and the image forming apparatus may experience data transmission failures such as data distortion, data transmission interruption, and the like.

If a current loop is formed between the image forming apparatus and the chip, it may indicate that the image forming apparatus is in contact with the chip. As for whether the contact is desired, it needs to be determined according to the electrical parameter of the current loop.

In an implementation manner, in the case of a desired contact, the current of the current loop may be greater than or equal to a preset value; and in the case of poor contact, the current of the current loop may be less than a preset value.

For details on how to implement the current loop, determine whether the contact between the chip and the image forming apparatus is desired according to the electrical parameter of the current loop, and perform different processing mechanisms according to test results, refer to Chinese Patent Application No. CN201910817052.0, which may not described in detail herein.

Embodiment of the present disclosure also provide a chip. The chip may be capable of being installed on a consumable, the consumable may be capable of being detachably installed on an image forming apparatus, and the image forming apparatus may include an installation detecting pin. The consumable may include:

an installation detecting terminal, configured to be electrically connected to the installation detecting pin when the chip is installed in the consumable and the consumable is installed in the image forming apparatus;

a chip controller, configured to control the installation detecting terminal to output a low level after the consumable chip is powered on; and a storage unit, configured to store a time control parameter, where the time control parameter may be configured to control a time point for the installation detecting terminal to output the low level.

In an optional implementation manner, the above-mentioned chip further includes:

a timer, configured to start timing from zero after receiving the clock synchronization signal transmitted by the image forming apparatus;

the above-mentioned storage unit, specifically configured to store preset timing information; and the above-mentioned chip controller, specifically configured to control the installation detecting terminal to output the low level when the timing value of the timer reaches a corresponding preset first timing value.

In an optional implementation manner, the above-mentioned storage unit may be specifically configured to store a preset first timing value.

In an optional implementation manner, the above-mentioned storage unit may be specifically configured to store its own color feature value and a lookup table that stores the corresponding relationship between a plurality of color feature values and a plurality of preset timing values.

The chip controller may be configured to determine the preset first timing value based on its own color feature value combined with the lookup table.

In an optional implementation manner, the above-mentioned chip may further include:

a timer, configured to start timing from zero when the quantity of chips that have outputted low levels is same as a corresponding preset first chip-quantity;

the storage unit, specifically configured to store preset chip-quantity information and preset timing information; and the chip controller, specifically configured to control the installation detecting terminal to output the low level when the timing value of the timer reaches a corresponding preset second timing value.

In an optional implementation manner, the above-mentioned storage unit may be configured to store preset first chip-quantities and preset second timing values.

In an optional implementation manner, the above-mentioned storage unit may be specifically configured to store its own color feature value and a lookup table that stores the corresponding relations between a plurality of color feature values, and a plurality of preset chip-quantities, and a plurality of preset timing values.

The chip controller may be configured to determine the preset first chip-quantity and the preset second timing value based on its own color feature value combined with the lookup table.

The number of lookup tables that store the corresponding relationship between the plurality of color feature values, the plurality of preset chip-quantities, and the plurality of preset timing values may be one or multiple. The number and form of the lookup tables may not be limited in the present disclosure, as long as the chip can determine the preset first chip-quantity and the preset second timing value through the lookup table in the storage unit.

In an optional implementation manner, the above-mentioned storage unit may be specifically configured to store the preset chip-quantity information.

The above-mentioned chip controller may be specifically configured to acquire the quantity of chips that have outputted low levels, and when the quantity of chips that have outputted low levels is same as a corresponding preset second chip-quantity, the chip controller may be configured to control the installation detecting terminal to output the low level.

In an optional implementation manner, the above-mentioned storage unit may be configured to store the preset second chip-quantity.

In an optional implementation manner, the above-mentioned storage unit may be specifically configured to store its own color feature value and a lookup table that stores the corresponding relationship between a plurality of color feature values and a plurality of preset chip-quantities.

The chip controller may be configured to determine the preset second chip-quantity based on its own color feature value combined with the lookup table.

In an optional implementation manner, the above-mentioned storage unit may be specifically configured to store the preset chip-quantity information.

The above-mentioned chip controller may be specifically configured to acquire the quantity of chips that have outputted low levels. When the quantity of chips that have outputted low levels is 0, after receiving the clock synchronization signal or the preset control instruction transmitted by the image forming apparatus, the chip controller may be configured to control the installation detecting terminal to output the low level; or when the quantity of chips that have outputted low levels is 0, the chip controller may be configured to directly control the above-mentioned installation detecting terminal to output the low level.

In an optional implementation manner, the above-mentioned storage unit may be configured to store a preset third chip-quantity, and the preset third chip-quantity may be zero.

In an optional implementation manner, the above-mentioned storage unit may be specifically configured to store its own color feature value and a lookup table that stores the corresponding relationship between a plurality of color feature values and a plurality of preset chip-quantities.

The chip controller may be configured to determine the preset third chip-quantity based on its own color feature value combined with the lookup table, and the preset third chip-quantity may be 0.

The above-mentioned preset chip-quantity value and preset first, second, and third chip-quantities may be configured to indicate the quantity of chips that have outputted low levels, that is, the number of times that other chips have outputted low levels detected by a current chip.

In an optional implementation manner, the chip may further include a counter, configured to count received pulse signals transmitted by the image forming apparatus from zero after receiving the clock synchronization signal transmitted by the image forming apparatus.

The above-mentioned storage unit may be specifically configured to store preset pulse count information.

The above-mentioned chip controller may be specifically configured to control the installation detecting terminal to output the low level when the count value of the counter reaches a corresponding preset count value.

In an optional implementation manner, the above-mentioned storage unit may be configured to store a preset count value.

In an optional implementation manner, the above-mentioned storage unit may be specifically configured to store its own color feature value and a lookup table storing the corresponding relations between a plurality of color feature values and a plurality of preset pulse signal count values.

The chip controller may be configured to determine a preset count value based on its own color feature value combined with the lookup table.

Embodiments of the present disclosure provide a chipset including M chips. The M chips may be installed on a plurality of consumables in one-to-one correspondence. The plurality of consumables may be detachably installed on an image forming apparatus. The image forming apparatus may include an installation detecting pin, and the M chips may be electrically connected to the installation detecting pin through a same communication bus. When the image forming apparatus is powered on, the M chips may be powered on simultaneously.

Each chip may include:
  an installation detecting terminal, configured to be electrically connected to the installation detecting pin through the communication bus when the chip is installed in the consumable and the consumable is installed in the image forming apparatus; and
  a chip controller, configured to control the installation detecting terminal of the chip to output a low level after the chip is powered on.

The time points for the installation detecting terminals of all of the M chips to output low levels may be different from each other, and M may be a natural number greater than or equal to 2.

The quantity of chips may be M, and the number of corresponding consumables may be M or less than M, that is, the plurality of chips may be installed on one consumable.

In an implementation manner, the M chips may include the first chip, and the first chip may include a timer configured to start timing from zero after receiving the clock synchronization signal transmitted by the image forming apparatus.

The chip controller of the first chip may be specifically configured to control the installation detecting terminal to output a low level when the timing value of the timer reaches the preset first timing value.

In an optional implementation manner, the first chip may further include the first storage unit configured to store the preset first timing value.

In an optional implementation manner, the first chip may further include the second storage unit configured to store its own color feature value and a lookup table storing the corresponding relationship between a plurality of color feature values and a plurality of preset timing values.

The chip controller may be specifically configured to determine the preset first timing value based on its own color feature value combined with the lookup table.

In an optional implementation manner, the above-mentioned M chips may include the second chip; and the above-mentioned second chip may include a timer configured to start timing from zero when the quantity of chips that have outputted low levels is same as the corresponding preset first chip-quantity.

The chip controller of the second chip may be specifically configured to control the installation detecting terminal to output a low level when the timing value of the timer reaches a corresponding preset second timing value.

In an optional implementation manner, the second chip may include the third storage unit configured to store the preset first chip-quantity and the preset second timing value.

In an optional implementation manner, the second chip may further include the fourth storage unit, which is specifically configured to store its own color feature value and a lookup table storing the corresponding relationship between a plurality of color feature values, a plurality of preset chip-quantity values and a plurality of preset timing values.

The chip controller of the second chip may be configured to determine the preset first chip-quantity and the preset second timing value based on its own color feature value combined with the lookup table.

The number of lookup tables that store the corresponding relationship between the plurality of color feature values, the plurality of preset chip-quantities, and the plurality of preset timing values may be one or multiple. The number and form of the lookup tables may not be limited in the present disclosure, as long as the chip can determine the preset first chip-quantity and the preset second timing value through the lookup table in the storage unit.

In an optional implementation manner, the above-mentioned M chips may include the third chip; and the chip controller of the third chip may be specifically configured to acquire the quantity of chips that have outputted low levels, and when the quantity of chips that have outputted low levels is same as a corresponding preset second chip-quantity, control the above-mentioned installation detecting terminal to output a low level.

In an optional implementation manner, the above-mentioned third chip may include the fifth storage unit, which may be specifically configured to store the preset second chip-quantity.

In an optional implementation manner, the above-mentioned third chip may include the sixth storage unit, which may be specifically configured to store its own color feature value and a lookup table that stores the corresponding relationship between a plurality of the color feature values and a plurality of preset chip-quantities.

The chip controller may be configured to determine the preset second chip-quantity based on its own color feature value combined with the lookup table.

In an optional implementation manner, the above-mentioned M chips may include the fourth chip; and the above-mentioned chip controller of the fourth chip may be specifically configured to acquire the quantity of chips that have outputted low levels; when the quantity of chips that have outputted low levels is 0, the chip controller of the fourth chip may be configured to control the installation detecting terminal to output a low level after receiving the clock synchronization signal or the preset control instruction transmitted by the image forming apparatus; or when the quantity of chips that have outputted low levels is 0, the chip controller of the fourth chip may be configured to directly control the installation detecting terminal to output a low level.

In an optional implementation manner, the above-mentioned fourth chip may include the sixth storage unit configured to store the preset third chip-quantity.

In an optional implementation manner, the above-mentioned fourth chip may include the seventh storage unit, which may be specifically configured to store its own color feature value and a lookup table that stores the corresponding relationship between a plurality of the color feature values and a plurality of preset chip-quantities.

The chip controller may be configured to determine the preset third chip-quantity based on its own color feature value combined with the lookup table.

The above-mentioned preset chip-quantity value and preset first, second, and third chip-quantities may be configured to indicate the quantity of chips that have outputted low levels, that is, the number of times that other chips have outputted low levels detected by a current chip.

In an optional implementation manner, the above-mentioned M chips may include the fifth chip; and the fifth chip may further include a counter configured to count received pulse signals transmitted by the image forming apparatus from zero after receiving the clock synchronization signal transmitted by the image forming apparatus.

In an optional implementation manner, the chip controller of the fifth chip may be specifically configured to control the installation detecting terminal to output a low level when the count value of the counter reaches a preset count value.

In an optional implementation manner, the above-mentioned fifth chip may include the eighth storage unit configured to store the preset count value.

In an optional implementation manner, the above-mentioned fifth chip may further include the ninth storage unit, which may be specifically configured to store its own color feature value and a lookup table storing the corresponding relationship between a plurality of the color feature values and a plurality of preset pulse signal count values; and the chip controller of the fifth chip may be configured to determine the preset count value based on its own color feature value combined with the lookup table.

The above-mentioned chipset may include one or more types of the above-mentioned plurality of chips, and as long as the time points for the installation detecting terminals of all chips to output low levels may be different from each other, which may be within the protection scope of the present disclosure.

Figure 13:
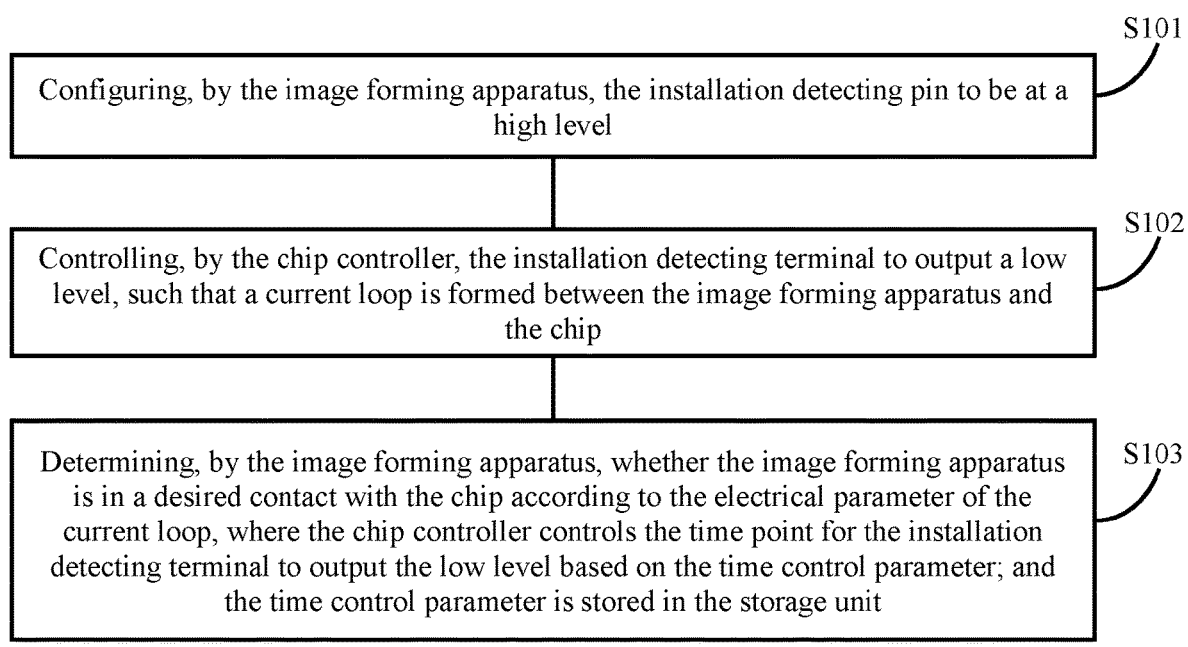
FIG. 13 illustrates a flowchart of an electrical parameter detection method provided by exemplary embodiments of the present disclosure.

As shown in FIG. 13, embodiments of the present disclosure provide an electrical parameter detection method, which may be applied between the image forming apparatus and the chip; the chip may be installed on the consumable; the consumable may be detachably installed on the image forming apparatus; the image forming apparatus may include the installation detecting pin; and the chip may include the chip controller, the installation detecting terminal, and the storage unit. The method may include the following steps.

At step S101, the image forming apparatus may configure the installation detecting pin to be at a high level.

At step S102, the chip controller may control the installation detecting terminal to output a low level, such that a current loop may be formed between the image forming apparatus and the chip.

At step S103, the image forming apparatus may determine whether the image forming apparatus is in a desired contact with the chip according to the electrical parameter of the current loop, where the chip controller may specifically control the time point for the installation detecting terminal to output the low level based on the time control parameter, and the time control parameter may be stored in the storage unit.

In an optional implementation manner, the above-mentioned chip may include a timer, and the above-mentioned timer may start timing from zero after receiving the clock synchronization signal transmitted by the image forming apparatus.

The above-mentioned specific controlling, by the chip controller, the time point for the installation detecting terminal to output the low level based on the time control parameter may include, when the timing value of the timer reaches the preset first timing value, controlling the installation detecting terminal to output the low level by the chip controller.

In an optional implementation manner, the above-mentioned chip may further include a timer; and specific controlling, by the chip controller, the time point for the installation detecting terminal to output the low level based on the time control parameter may include:

the chip controller may acquire the quantity of chips that have outputted low levels, and when the quantity of chips that have outputted low levels is same as the preset first chip-quantity, may control the timer to start timing from zero; and when the timing value of the timer reaches the preset second timing value, the chip controller may control the installation detecting terminal to output the low level.

In an optional implementation manner, the above-mentioned specific controlling, by the chip controller, the time point for the installation detecting terminal to output the low level based on the time control parameter may include that the above-mentioned chip controller may acquire the quantity of chips that have outputted low levels; and when the quantity of second chips that have outputted low levels is same as the preset second chip-quantity, the chip controller may control the installation detecting terminal to output the low level.

In an optional implementation manner, the above-mentioned specific controlling, by the chip controller, the time point for the installation detecting terminal to output the low level based on the time control parameter may include that the above-mentioned chip controller may acquire the quantity of chips that have outputted low levels; when the quantity of chips that have outputted low levels is 0, after receiving the clock synchronization signal or the preset control instruction transmitted by the image forming apparatus, the chip controller may control the installation detecting terminal to output the low level; or when the quantity of chips that have outputted low levels is 0, the chip controller may directly control the above-mentioned installation detecting terminal to output the low level.

In an optional implementation manner, the above-mentioned chip may further include a counter; and specific controlling, by the chip controller, the time point for the installation detecting terminal to output the low level based on the time control parameter may include that, after receiving the clock synchronization signal transmitted by the image forming apparatus, the timer may count received pulse signals transmitted by the image forming apparatus from zero.

When the count value of the counter reaches the preset count value, the installation detecting terminal may be controlled to output the low level.

Figure 14:
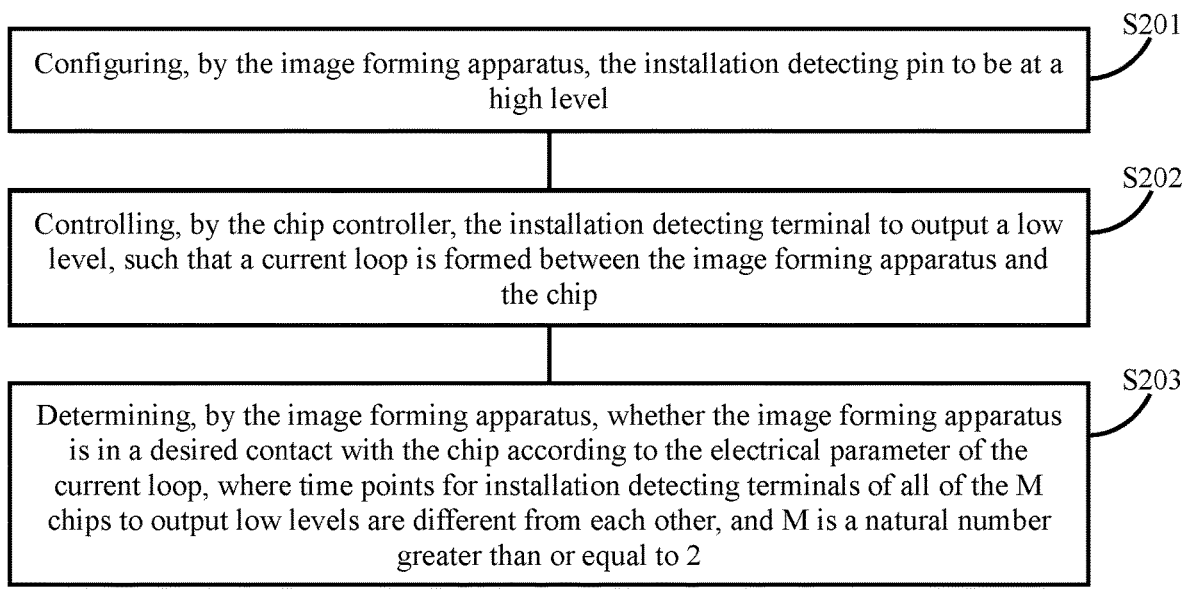
FIG. 14 illustrates another flowchart of an electrical parameter detection method provided by exemplary embodiments of the present disclosure.

As shown in FIG. 14, embodiments of the present disclosure provide an electrical parameter detection method, which is applied to the image forming apparatus and the chipset. The chipset may include M chips; the M chips may be installed on a plurality of consumables in a one-to-one correspondence; the plurality of consumables may be detachably installed on the image forming apparatus; the image forming apparatus may include the installation detecting pin; the M chips may be electrically connected to the installation detecting pin through a same communication bus; and each chip may include the installation detecting terminal and the chip controller. The method may include the following steps.

At step S201, the image forming apparatus may configure the installation detecting pin to be at a high level.

At step S202, the chip controller of each chip may control the installation detecting terminal to output a low level, such that a current loop may be formed between the image forming apparatus and the chip.

At step S203, the image forming apparatus may determine whether the image forming apparatus is in a desired contact with the chip according to the electrical parameter of the current loop, where the time points for the installation detecting terminals of all chips in the above-mentioned M chips to output low levels may be different from each other, and M may be a natural number greater than or equal to 2.

In an optional implementation manner, each of the above-mentioned chips may further include a timer configured to start timing from zero after receiving the clock synchronization signal transmitted by the image forming apparatus.

Controlling, by the chip controller of each of the above-mentioned chips, the above-mentioned installation detecting terminal to output the low level may include that, when the timing value of the timer of each chip reaches a corresponding preset first timing value, the chip controller of each chip may control the installation detecting terminal to output the low level, where the preset first timing values corresponding to all of the M chips may be different from each other.

In an optional implementation manner, each of the above-mentioned chips may store the preset first timing value.

In an optional implementation manner, each of the above-mentioned chips may store its own color feature value and a lookup table storing the corresponding relationship between a plurality of the color feature values and a plurality of preset timing values; and the chip controller may specifically determine the preset first timing value based on its own color feature value combined with the lookup table.

In an optional implementation manner, the above-mentioned M chips may include N sixth chips and one seventh chip, and N may be a natural number greater than or equal to 1.

The above-mentioned seventh chip may be the chip that outputs the low level first.

Each sixth chip of the above-mentioned N sixth chips may further include a first timer; and the first timer may be configured to start timing from zero when the quantity of chips other than the sixth chip that have outputted low levels in the M chips is same as a corresponding preset first chip-quantity, where the preset first chip-quantities corresponding to all of the above-mentioned N sixth chips may be different from each other.

Controlling, by the chip controller of each of the above-mentioned chips, the above-mentioned installation detecting terminal to output the low level may include:

when the timing value of each of the first timers reaches a corresponding preset second timing value, the chip controller of each of the sixth chips may control the installation detecting terminal of the sixth chip to output a low level;

the above-mentioned seventh chip may include a second timer; the second timer may be configured to start timing from zero after receiving at least one of the power-on signal, the clock synchronization signal, and the preset control instruction of the image forming apparatus; and when the timing value of the second timer reaches the preset third timing value, the chip controller of the seventh chip may control the installation detecting terminal of the seventh chip to output a low level; or the chip controller of the seventh chip may acquire the quantity of chips that have outputted low levels; when the quantity of chips that have outputted low levels is 0, after receiving the clock synchronization signal or the preset control instruction transmitted by the image forming apparatus, the chip controller of the seventh chip may control the installation detecting terminal of the seventh chip to output a low level; or when the quantity of chips that have outputted low levels is 0, the chip controller of the seventh chip may directly control the installation detecting terminal of the seventh chip to output a low level.

In an optional implementation manner, each of the above-mentioned sixth chips may store the preset first chip-quantity and the preset second timing value.

In an optional implementation manner, each of the above-mentioned sixth chips may store its own color feature value and a lookup table storing the corresponding relation between a plurality of color feature values, a plurality of preset chip-quantities, and a plurality of preset timing values; and the chip controller of the above-mentioned sixth chip may specifically determine the preset second timing value and the preset first chip-quantity based on its own color feature value combined with the lookup table.

In an optional implementation manner, the seventh chip may store the preset third timing value.

In an optional implementation manner, the above-mentioned seventh chip may store its own color feature value and a lookup table storing the corresponding relationship between a plurality of color feature values and a plurality of preset timing values; and the chip controller of the above-mentioned seventh chip may specifically determine the preset third timing value based on its own color feature value combined with the lookup table.

In an optional implementation manner, the seventh chip may store the preset third chip-quantity, and the preset third chip-quantity may be zero.

In an optional implementation manner, the above-mentioned seventh chip may store its own color feature value and a lookup table that stores the corresponding relationship between a plurality of color feature values and a plurality of preset chip-quantities; the chip controller of the above-mentioned seventh chip may specifically determine the preset third chip-quantity based on its own color feature value combined with the lookup table; and the preset third chip-quantity may be 0.

In an optional implementation manner, the above-mentioned M chips may include N eighth chips and one ninth chip; the above-mentioned ninth chip may be a chip that outputs a low level first; and N may be a natural number greater than or equal to 1.

Above-mentioned controlling, by the chip controller of each chip, the above-mentioned installation detecting terminal to output the low level may include:

after receiving at least one of the power-on signal, clock synchronization signal, and preset control instruction of the image forming apparatus, the chip controller of the ninth chip may control the installation detecting terminal of the ninth chip to output a low level; or when the chip controller of the above-mentioned ninth chip acquires the quantity of chips that have outputted low levels, and when the quantity of chips that have outputted low levels is 0, the installation detecting terminal of the ninth chip may be controlled to output a low level after receiving the clock synchronization signal or the preset control instruction transmitted by the image forming apparatus; or when the quantity of chips that have outputted low levels is the chip controller of the ninth chip may directly control the installation detecting terminal of the ninth chip to output a low level; and when the quantity of other chips that have outputted low levels in the M chips is same as a corresponding preset second chip-quantity, the chip controller of the eighth chip may control the installation detecting terminal of the eighth chip to output a low level, where the preset second chip-quantities corresponding to all eighth chips of the N eighth chips may be different from each other.

In an optional implementation manner, the above-mentioned eighth chip may store the preset second chip-quantity.

In an optional implementation manner, the above-mentioned eighth chip may store a lookup table that stores its own color feature value and the corresponding relationship between a plurality of color feature values and a plurality of preset chip-quantities.

The chip controller may be configured to determine the preset second chip-quantity based on its own color feature value combined with the lookup table.

In an optional implementation manner, the above-mentioned ninth chip may store the preset third chip-quantity, and the preset third chip-quantity may be zero.

In an optional implementation manner, the above-mentioned ninth chip may store its own color feature value and a lookup table storing the corresponding relationship between a plurality of color feature values and a plurality of preset chip-quantities; the chip controller of the above-mentioned ninth chip may specifically determine the preset third chip-quantity based on its own color feature value combined with the lookup table; and the preset third chip-quantity may be 0.

In an optional implementation manner, above-mentioned chip may include a counter; and specific controlling, by the chip controller, the time point for the installation detecting terminal to output the low level based on the time control parameter may include:

in an optional implementation manner, after receiving the clock synchronization signal transmitted by the image forming apparatus, the counter may start counting received pulse signals transmitted by the image forming apparatus from zero; and when the count value of the counter reaches the preset count value, the installation detecting terminal may be controlled to output the low level.

In an optional implementation manner, each of the above-mentioned chips may store the preset count value.

In an optional implementation manner, each of the above-mentioned chips may store its own color feature value and a lookup table storing the corresponding relation between a plurality of color feature values and a plurality of preset pulse signal count values; and the chip controller may specifically determine the preset count value based on its own color feature value combined with the lookup table.

Embodiment of the present disclosure provide a consumable, including a developer accommodating portion, configured for accommodating a developer, and the chip in any of above-mentioned embodiments.

In an optional implementation manner, the consumables may further include a developer conveying portion, configured to convey the developer.

The developer conveying portion may be a developing element or a developer conveying element, and may further include the developing element and the developer conveying element, which may not be limited herein.

In an optional implementation manner, the consumables may further include a photosensitive drum, and a charging roller configured to charge the photosensitive drum.

Embodiments of the present disclosure provide a consumable, including a photosensitive drum, and a charging roller configured to charge the photosensitive drum, and the chip in any of above-mentioned embodiments.

Embodiments of the present disclosure also provide an image forming apparatus. The image forming apparatus may include:
 a plurality of consumables;
 a chipset, where the chipset may include a plurality of chips, each of the plurality of chips is installed on one of the plurality of consumables, and a chip of the plurality of chips may include an installation detecting terminal and a chip controller;
 an installation detecting pin, configured to be electrically connected to the above-mentioned installation detecting terminal of the above-mentioned chip;
 an image forming controller, configured to configure the above-mentioned installation detecting pin to be at a high level; and
 a chip controller, configured to control the installation detecting terminal to output a low level, where the time points for the installation detecting terminals of all of the above-mentioned plurality of chips to output low levels may be different from each other.

Embodiment of the present disclosure provide an image forming apparatus. A plurality of consumables may be detachably installed on the image forming apparatus; a chip may be installed on each consumable; the chips on the plurality of consumables may form a chipset; the image forming apparatus may include an installation detecting pin; and the chip may include an installation detecting terminal and a chip controller.

The image forming apparatus may include:
 the installation detecting pin, configured to be electrically connected to the installation detecting terminal of the chip; and
 an image forming controller, configured to set the installation detecting pin to be at a high level, where the voltage of the installation detecting pin may be higher than the voltage of the installation detecting terminal; when the voltage of the installation detecting pin is higher than the voltage of the installation detecting terminal, a current loop may be formed between the image forming apparatus and the chip; the image forming apparatus may also be configured to determine whether the image forming apparatus is in a desired contact with the chip according to the electrical parameter of the current loop; and the time point for forming the current loop between one chip in the above-mentioned chipset and the image forming apparatus may be different from the time point for forming the current loop between a chip other than the one chip in the above-mentioned chipset and the image forming apparatus.

For example, the chips in the chipset may include 4 chips, including an A1 chip, an A2 chip, an A3 chip, and an A4 chip, respectively. After each chip of the chipset is powered on, the time point when the current loop is formed between the A1 chip and the image forming apparatus is t1; the time point when the current loop is formed between the A2 chip and the image forming apparatus is t2; the time point when a current loop is formed between the A3 chip and the image forming apparatus is t3; and the time point when a current loop is formed between the A4 chip and the image forming apparatus is t4. Therefore, t1, t2, t3, and t4 may be different from each other.

In an optional implementation manner, the chip controller may be specifically configured to receive the clock synchronization signal, or the preset instruction, or the power-on signal transmitted by the image forming apparatus, thereby controlling the installation detecting terminal to output the low level.

In an optional implementation, the chip may further include a timer; and the image forming controller may be specifically configured to transmit the clock synchronization signal to the chip, such that the timer may start timing from zero after receiving the clock synchronization signal.

In an optional implementation, the chip may further include a counter; and the image forming controller may be specifically configured to transmit the clock synchronization signal and the pulse signal to the chip, such that the counter may start counting received pulse signals from zero after receiving the clock synchronization signal.

Those skilled in the art should clearly understand that, for the convenience and conciseness of the description, the structure and specific implementation process and principles of the chip, the chipset, the electrical parameter detection method, and the image forming apparatus described above may refer to the corresponding content in the above-mentioned embodiments, which may not be limited herein.

The above may merely be specific implementation manners of the present disclosure. Those skilled in the art may easily think of changes or substitutions within the technical scope disclosed in the present disclosure, which should be covered by the protection scope of the present disclosure. The protection scope of the present disclosure shall be subject to the protection scope of the claims.

What is claimed is:

1. A chip, wherein the chip is capable of being installed on a consumable, a plurality of the consumables is capable of being installed on an image forming apparatus, the chip comprising:
    an installation detecting terminal;
    a chip controller, configured to control the installation detecting terminal to output a low level after the chip is powered on, wherein a time point for the installation detecting terminal of the chip installed in one of the plurality of consumables is different from a time point for the installation detecting terminal of the chip installed on another one of the plurality of consumables.

2. The chip according to claim 1, wherein:
    the chip further includes a timer, configured to, after receiving a clock synchronization signal, start timing from zero;
    the chip controller is configured to, when a timing value of the timer reaches a corresponding preset first timing value, control the installation detecting terminal to output the low level.

3. The chip according to claim 1, wherein:
    the chip further includes a timer, configured to, when a quantity of chips that have outputted low levels is same as a corresponding preset first chip-quantity, start timing from zero;
    the chip controller is configured to, when a timing value of the timer reaches a corresponding preset second timing value, control the installation detecting terminal to output the low level.

4. The chip according to claim 1, wherein:
    the chip controller is further configured to control the installation detecting terminal to output the low level when it is detected that a quantity of low levels on a communication bus reaches a preset value after the chip is powered on.

5. The chip according to claim 1, wherein: the chip controller is configured to acquire a quantity of chips that have outputted low levels, wherein:
    when the quantity of chips that have outputted low levels is 0, the chip controller is configured to control the installation detecting terminal to output the low level, after receiving a clock synchronization signal or a preset control instruction transmitted by an image forming apparatus; or
    when the quantity of chips that have outputted low levels is 0, the chip controller is configured to directly control the installation detecting terminal to output the low level.

6. The chip according to claim 1, wherein:
    the chip further includes a counter, configured to, after receiving a clock synchronization signal, count received pulse signals from zero; and
    the chip controller is configured to, when a count value of the counter reaches a corresponding preset count value, control the installation detecting terminal to output the low level.

7. An electrical parameter detection method, applied by a chip, wherein the chip is installed on a consumable; the consumable is detachably installed on an image forming apparatus; the image forming apparatus includes an installation detecting pin; and
    the chip includes a chip controller and an installation detecting terminal, and the electrical parameter detection method comprising:
    controlling, by the chip controller, the installation detecting terminal to output a low level, such that a current loop is formed between the image forming apparatus and the chip; and
    an electrical parameter of the current loop is configured to determine whether the image forming apparatus is in a desired contact with the chip, wherein the chip controller controls a time point for the installation detecting terminal to output the low level based on a time control parameter.

8. The method according to claim 7, wherein:
    the chip includes a timer; and the timer, after receiving a clock synchronization signal, starts timing from zero; and
    the chip controller controls the time point for the installation detecting terminal to output the low level, by performing:

when a timing value of the timer reaches a preset first timing value, controlling the installation detecting terminal to output the low level by the chip controller.

9. The method according to claim 7, wherein: the chip further includes a timer;
and the chip controller controls the time point for the installation detecting terminal to output the low level, by performing:
acquiring, by the chip controller, a quantity of chips that have outputted low levels, and when the quantity of chips that have outputted low levels is same as a preset first chip-quantity, controlling the timer to start timing from zero; and
when a timing value of the timer reaches a preset second timing value, controlling, by the chip controller, the installation detecting terminal to output the low level.

10. The method according to claim 7, wherein the chip controller controls the time point for the installation detecting terminal to output the low level, by performing:
controlling the installation detecting terminal to output a low level when it is detected that a quantity of low levels on a communication bus reaches a preset value after the chip is powered on.

11. The method according to claim 7, wherein the chip controller controls the time point for the installation detecting terminal to output the low level, by performing:
acquiring, by the chip controller, a quantity of chips that have outputted low levels; when the quantity of chips that have outputted low levels is 0, controlling, by the chip controller, the installation detecting terminal to output the low level after receiving a clock synchronization signal or a preset control instruction transmitted by the image forming apparatus; or when the quantity of chips that have outputted low levels is 0, directly controlling, by the chip controller, the installation detecting terminal to output the low level.

12. The method according to claim 7, wherein:
the chip further includes a counter; and the chip controller controls the time point for the installation detecting terminal to output the low level, by performing:
after receiving a clock synchronization signal transmitted by the image forming apparatus, counting, by the counter, received pulse signals from zero; and
when a count value of the counter reaches a preset count value, controlling the installation detecting terminal to output the low level.

13. An electrical parameter detection method, applied by a chipset, wherein the chipset includes M chips; the M chips are installed on a plurality of consumables in a one-to-one correspondence; the plurality of consumables are detachably installed on an image forming apparatus; the image forming apparatus includes an installation detecting pin; and each chip includes an installation detecting terminal and a chip controller, the electrical parameter detection method comprising:
controlling, by the chip controller of each chip, the installation detecting terminal to output a low level, such that a current loop is formed between the image forming apparatus and the each chip that has output the low level; and
an electrical parameter of the current loop is configured to determine whether the image forming apparatus is in a desired contact with the chip, wherein time points for installation detecting terminals of all of the M chips to output low levels are different from each other, and M is a natural number greater than or equal to 2.

14. The method according to claim 13, wherein:
each chip further includes a timer, configured to, after receiving a clock synchronization signal, start timing from zero; and
controlling, by the chip controller of each chip, the installation detecting terminal to output the low level includes:
when a timing value of the timer of each chip reaches a corresponding preset first timing value, controlling, by the chip controller of each chip, the installation detecting terminal to output the low level, wherein preset first timing values corresponding to all of the M chips are different from each other.

15. The method according to claim 13, wherein:
the M chips include N sixth chips and one seventh chip, and N is a natural number greater than or equal to 1;
the seventh chip is a chip which outputs a low level first;
each sixth chip of the N sixth chips further includes a first timer; and the first timer is configured to start timing from zero when a quantity of chips other than the sixth chip that have outputted low levels in the M chips is same as a corresponding preset first chip-quantity, wherein preset first chip-quantities corresponding to all of the N sixth chips are different from each other; and
the seventh chip includes a second timer;
and controlling, by the chip controller of each chip, the installation detecting terminal to output the low level includes:
when a timing value of each first timer reaches a corresponding preset second timing value, controlling, by a chip controller of each sixth chip, an installation detecting terminal of the sixth chip to output a low level;
configuring the second timer to start timing from zero after receiving at least one of a power-on signal, a clock synchronization signal, and a preset control instruction of the image forming apparatus; and when a timing value of the second timer reaches a preset third timing value, controlling, by a chip controller of the seventh chip, an installation detecting terminal of the seventh chip to output a low level; or
acquiring, by a chip controller of the seventh chip, a quantity of chips that have outputted low levels; when the quantity of chips that have outputted low levels is 0, after receiving a clock synchronization signal or a preset control instruction transmitted by the image forming apparatus, controlling, by the chip controller of the seventh chip, the installation detecting terminal of the seventh chip to output a low level; or when the quantity of chips that have outputted low levels is 0, directly controlling, by the chip controller of the seventh chip, the installation detecting terminal of the seventh chip to output a low level.

16. The method according to claim 13, wherein:
the M chips include N eighth chips and one ninth chip; the ninth chip is a chip that outputs a low level first; and N is a natural number greater than or equal to 1; and
controlling, by the chip controller of each chip, the installation detecting terminal to output the low level includes:
after receiving at least one of a power-on signal, a clock synchronization signal, and a preset control instruction of the image forming apparatus, controlling, by a chip controller of the ninth chip, an installation detecting terminal of the ninth chip to output a low level; or
when the chip controller of the ninth chip acquires a quantity of chips that have outputted low levels, and when the quantity of chips that have outputted low levels is 0, controlling the installation detecting terminal of the ninth chip to output the low level after receiving a clock synchronization signal or a preset control instruction transmitted by the image forming apparatus; or when the quantity of chips that have outputted low levels is 0, directly controlling, by the chip controller of the ninth chip, the installation detecting terminal of the ninth chip to output the low level; and when a quantity of chips other than the eighth chip that have outputted low levels in the M chips is same as a corresponding preset second chip-quantity, controlling, by the chip controller of the eighth chip, an installation detecting terminal of the eighth chip to output a low level, wherein preset second chip-quantities corresponding to all of the N eighth chips are different from each other.

17. The method according to claim 13, wherein the each chip further includes a counter; and controlling, by the chip controller of each chip, the installation detecting terminal to output the low level includes:

after receiving a clock synchronization signal, counting, by a timer, received pulse signals from zero; and when a count value of the timer reaches a corresponding preset count value, controlling the installation detection terminal to output the low level, wherein preset count values corresponding to all of the M chips are different from each other.

18. A consumable, comprising:
the chip according to claim 1.

19. The consumable according to claim 18, further including:
a developer conveying element, configured to convey the developer; and/or
a photosensitive drum; and a charging roller, configured to charge the photosensitive drum.

20. A consumable, comprising:
a photosensitive drum;
a charging roller, configured to charge the photosensitive drum; and
the chip according to claim 1.

21. The chip according to claim 1, wherein:
the chip controller is further configured to control the installation detecting terminal to output a low level after a preset condition is met and a preset time has passed.

22. The chip according to claim 21, wherein the preset condition comprises:
a quantity of chips that have outputted low levels is same as a corresponding preset first chip-quantity, or
the chip receives one of a clock synchronization signal, a power-on signal and a preset control instruction sent by the image forming apparatus.

23. The method according to claim 7, wherein the chip controller controls the time point for the installation detecting terminal to output the low level, by performing:
controlling the installation detecting terminal to output a low level, after a preset condition is met and a preset time has passed.

24. The method according to claim 23, wherein the preset condition includes:
a quantity of chips that have outputted low levels is same as a corresponding preset first chip-quantity, or
the chip receives one of a clock synchronization signal, a power-on signal and a preset control instruction sent by the image forming apparatus.

25. The method according to claim 13, wherein the chip controller of each chip controls the installation detecting terminal to output a low level, by performing:
controlling the installation detecting terminals to output a low level, after a preset condition is met and when a preset time corresponding to a respective chip has passed.

26. The method according to claim 13, wherein the chip controller of each chip controls the installation detecting terminal to output a low level, by performing:
controlling the installation detecting terminal to output a low level when it is detected that a quantity of low levels on a communication bus reaches a preset value corresponding to each chip after the chip is powered on, wherein the preset value corresponding to each chip is different from each other.

27. The method according to claim 26, wherein the preset condition comprises:
a quantity of chips that have outputted low levels is same as a corresponding preset first chip-quantity, wherein the corresponding preset first chip-quantity is different from each other; or
each chip receives one of the clock synchronization signal, power-on signal and preset control instruction sent by the image forming apparatus.

* * * * *